(12) United States Patent
Norbeck et al.

(10) Patent No.: US 11,927,369 B2
(45) Date of Patent: Mar. 12, 2024

(54) SYSTEMS AND METHODS FOR GEOTHERMAL ENERGY STORAGE

(71) Applicant: FERVO ENERGY COMPANY, Berkeley, CA (US)

(72) Inventors: Jack Norbeck, Golden, CO (US); Timothy Latimer, Houston, TX (US); Christian Gradl, Houston, TX (US)

(73) Assignee: Fervo Energy Company, Houston, TX (US)

(*) Notice: Subject to any disclaimer, the term of this patent is extended or adjusted under 35 U.S.C. 154(b) by 0 days.

(21) Appl. No.: 18/026,541

(22) PCT Filed: Jul. 16, 2021

(86) PCT No.: PCT/US2021/070894
§ 371 (c)(1),
(2) Date: Mar. 15, 2023

(87) PCT Pub. No.: WO2022/061320
PCT Pub. Date: Mar. 24, 2022

(65) Prior Publication Data
US 2023/0408151 A1    Dec. 21, 2023

Related U.S. Application Data

(60) Provisional application No. 63/079,215, filed on Sep. 16, 2020.

(51) Int. Cl.
*F24T 10/20* (2018.01)
*F24T 10/00* (2018.01)

(52) U.S. Cl.
CPC ........... *F24T 10/20* (2018.05); *F24T 2010/56* (2018.05)

(58) Field of Classification Search
CPC ....... F24T 10/20; F24T 10/30; F24T 2010/50; F24T 2010/56; F03G 7/04; F03G 7/045; Y02E 10/10
See application file for complete search history.

(56) References Cited

U.S. PATENT DOCUMENTS 3,817,038 A   6/1974 Paull et al.
4,896,725 A   1/1990 Parker et al.
(Continued)

FOREIGN PATENT DOCUMENTS

WO   WO-2022061320 A1   3/2022

OTHER PUBLICATIONS

"International Application Serial No. PCT/US2021/070894, International Search Report dated Dec. 28, 2021", 4 pgs.
(Continued)

*Primary Examiner* — Loren C Edwards
(74) *Attorney, Agent, or Firm* — Schwegman Lundberg & Woessner, P.A.

(57) ABSTRACT

A method and system may be used for storing energy in a geothermal system and recovering both the stored energy as well as thermal energy on demand. The geothermal system may include injection and production wells that are hydraulically coupled in a geothermal energy reservoir that behaves as a confined reservoir system with thermal energy transferring to fluid injected into the injection well and removed via the production well. Injection flow rate, injection pressure, production flow rate, production backpressure, or fluid residence time may be managed to control energy consumption or energy generation profiles of the geothermal system. During an energy storage mode, the injection flow rate exceeds the production flow rate thereby storing energy in the geothermal reservoir. During an energy recovery mode, production backpressure is reduced thereby releasing the
(Continued)

stored energy and electricity is generated by removing the thermal energy from the fluid in a heat engine.

48 Claims, 15 Drawing Sheets

(56) References Cited

U.S. PATENT DOCUMENTS

| | | | |
|---|---|---|---|
| 5,685,362 A * | 11/1997 | Brown | F24T 10/20 165/45 |
| 2004/0206085 A1 | 10/2004 | Koenig et al. | |
| 2015/0369521 A1 | 12/2015 | Buscheck | |
| 2020/0173692 A1 | 6/2020 | Buscheck et al. | |
| 2020/0191444 A1 | 6/2020 | Nevison et al. | |
| 2020/0217181 A1 | 7/2020 | Norbeck et al. | |

OTHER PUBLICATIONS

"International Application Serial No. PCT/US2021/070894, Written Opinion dated Dec. 28, 2021", 10 pgs.
"International Application Serial No. PCT US2021 070894, International Preliminary Report on Patentability dated Mar. 30, 2023", 12 pgs.
"European Application Serial No. 21870437.7, Response to Communication pursuant to Rules 161(2) and 162 EPC filed Nov. 2, 2023", 17 pgs.

\* cited by examiner

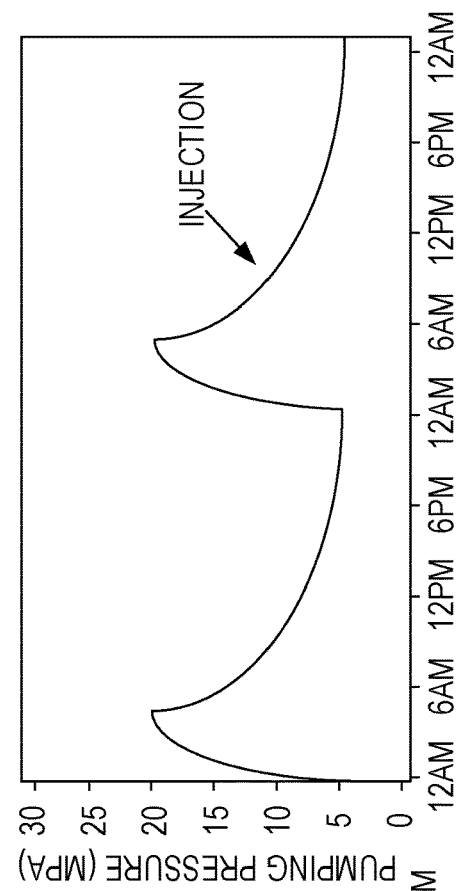
FIG. 5A
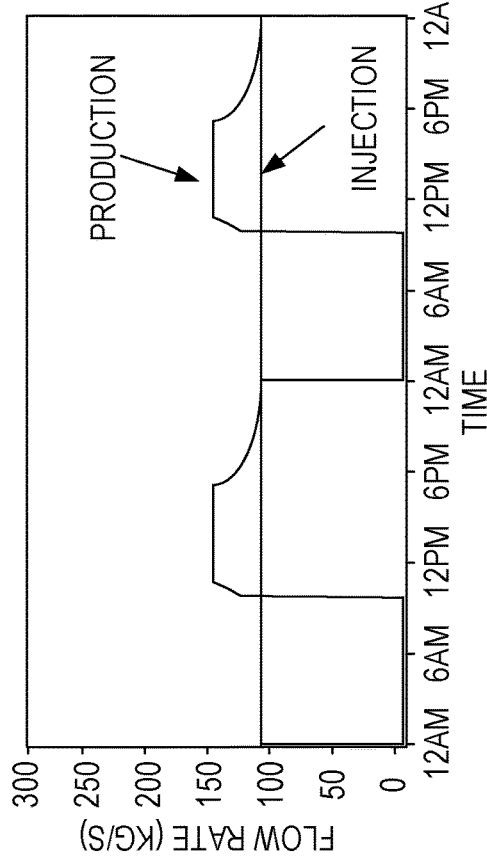
FIG. 5B
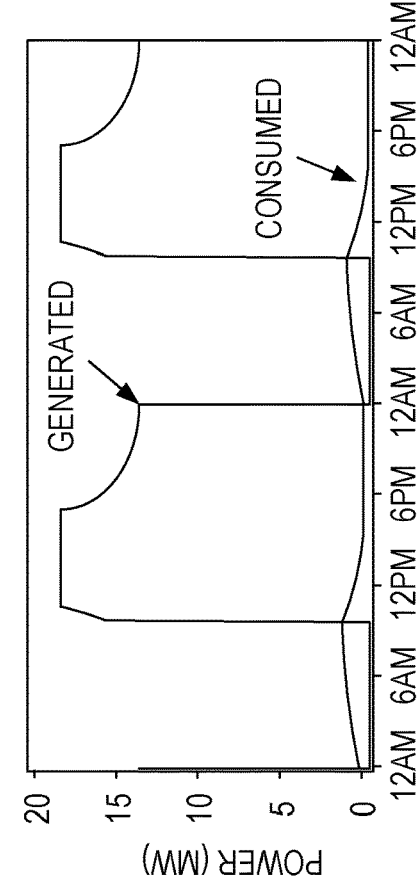
FIG. 5C
FIG. 5D

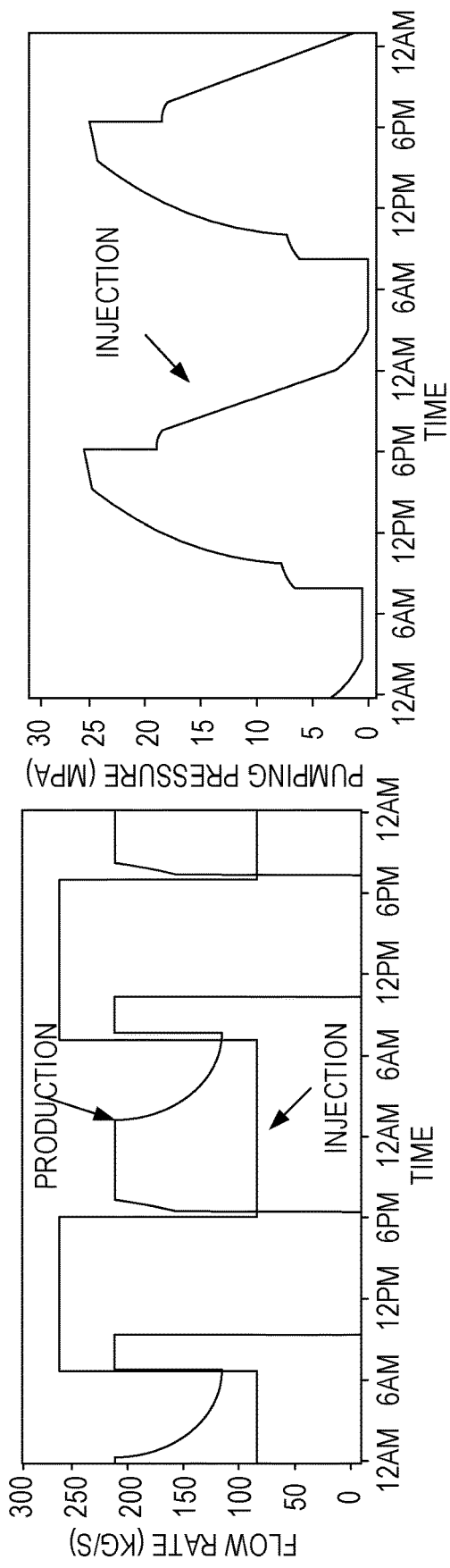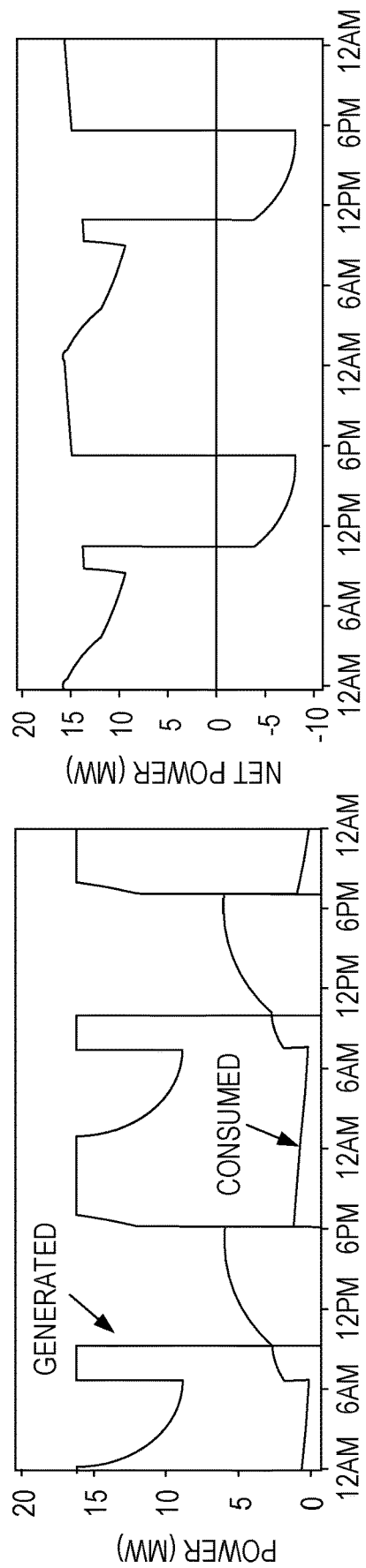

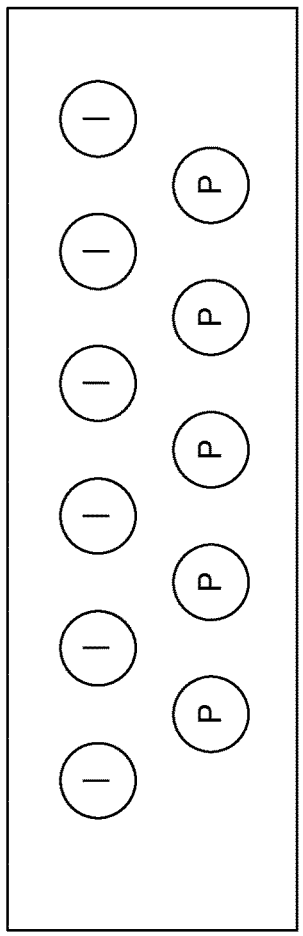
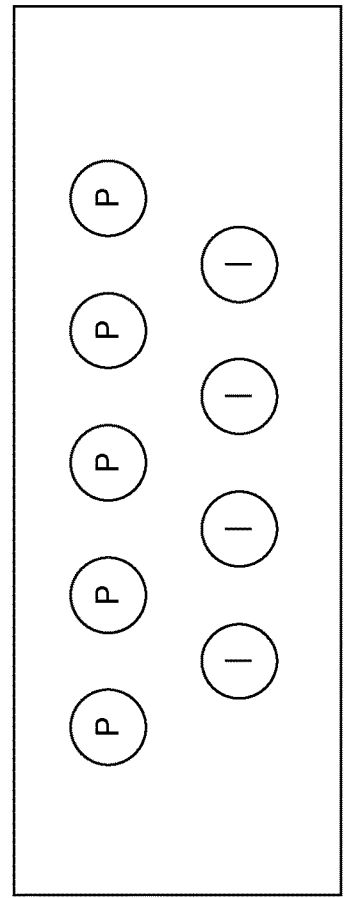

SYSTEMS AND METHODS FOR GEOTHERMAL ENERGY STORAGE

CLAIM OF PRIORITY

This application is a U.S. National Stage Application under 35 U.S.C. 371 from International Application Serial No. PCT/US2021/070894 filed Jul. 16, 2021, and published as WO 2022/061320 A1 on Mar. 24, 2022, which claims the benefit of priority to U.S. Provisional Patent Application Ser. No. 63/079,215 filed Sep. 16, 2020, titled "SYSTEMS AND METHODS FOR GEOTHERMAL ENERGY STORAGE," the entire contents of each of which is hereby incorporated by reference herein in its entirety.

STATEMENT REGARDING FEDERALLY SPONSORED RESEARCH OR DEVELOPMENT

This invention was made with government support under award number DESC0020823 awarded by the U.S. Department of Energy. The government has certain rights in the invention.

BACKGROUND

Geothermal energy systems typically use an injection well to introduce a cool injection fluid from the surface into a geothermal energy reservoir thousands of feet below ground. The geothermal energy reservoir is formation such as a heated rock formation. As the injected fluid travels through the geothermal reservoir, the fluid absorbs heat increasing its temperature or enthalpy. One or more production wells are also disposed in the formation and are offset from the injection well so that the heated fluid can be pumped up from the formation to the surface where the heat may be extracted from the heated fluid to provide useable energy, often in the form of electricity. For example, a generator such as a steam turbine, Organic Rankine Cycle turbine, or other turbine may be used to convert the thermal energy entrained in the geothermal fluid into electricity. When geothermal power is generated using an Organic Rankine Cycle power plant, geothermal is a clean, renewable, zero-emission energy source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 5A-5D show injection pressure, injection rate, and production rate profile over the course of a 48-hour period.

FIGS. 6A-6D show load profiles for an alternative injection/production scenario.

FIGS. 15A-15B illustrate example horizontal well patterns.

DETAILED DESCRIPTION

Figure 1:
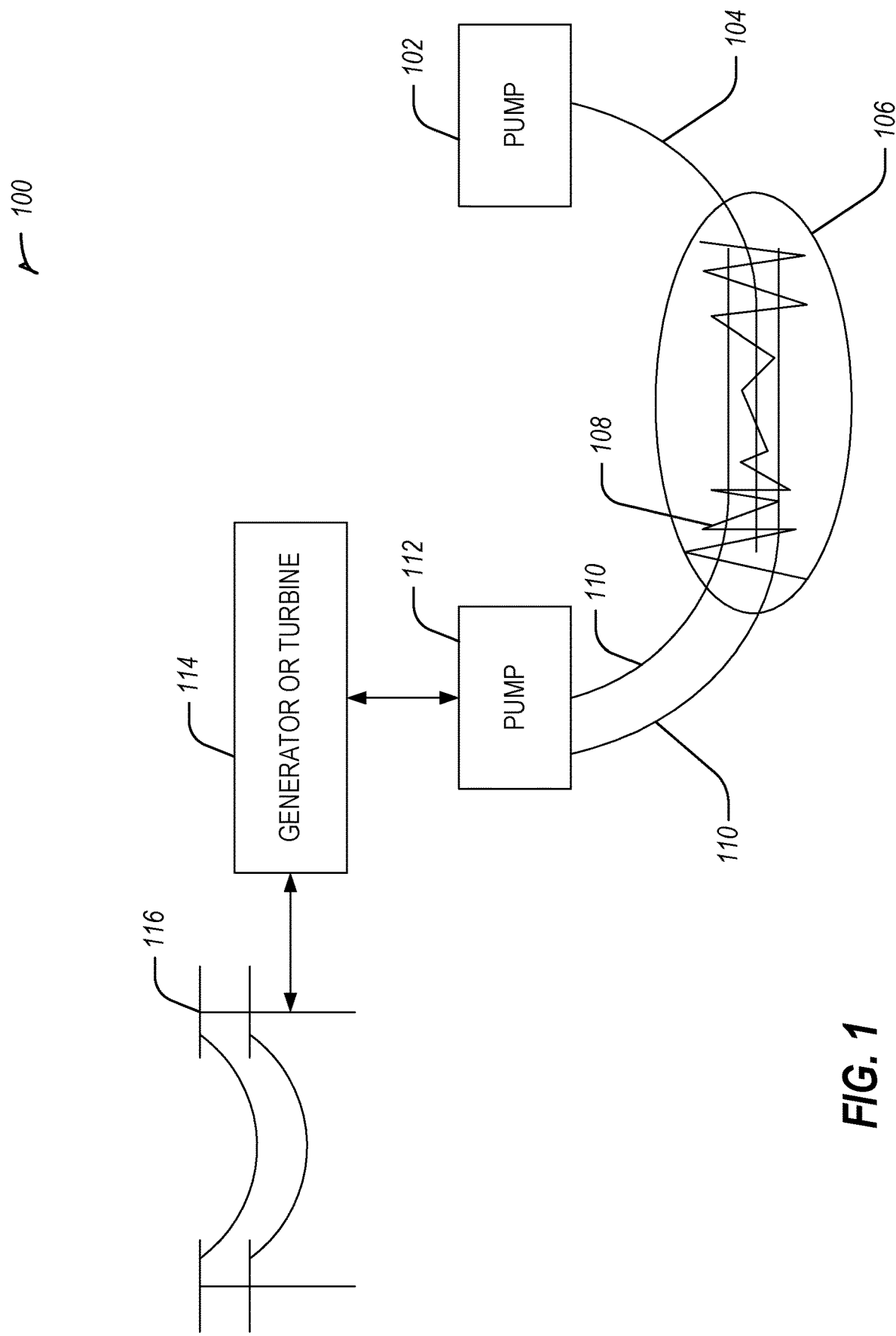
FIG. 1 shows an example of a geothermal well system.

Geothermal energy systems typically use an injection well to introduce a cool injection fluid from the surface into a geothermal energy reservoir thousands of feet below ground. The geothermal energy reservoir is often a heated rock formation. As the injected fluid travels through the geothermal reservoir, the fluid absorbs heat increasing its temperature or enthalpy. One or more production wells are also disposed in the rock and are offset from, and surround, the injection well so that the heated fluid can be pumped up from the rock to the surface where the heat may be extracted from the heated fluid to provide useable energy, often in the form of electricity. For example, a generator such as a steam turbine or other turbine may be used to convert the heated fluid into electricity.

Geothermal power plants have historically been operated in a baseload manner, where electricity generation remains relatively constant on a daily, weekly, or monthly basis. In many power markets, the value of energy supplied to or consumed from the power grid, typically in the form of electricity, can vary throughout the course of a day or at different times of the year due to a variety of factors. Therefore, it may be desirable to provide systems and methods that allow operation of a geothermal power plant in a flexible manner in order to be more cost competitive.

Currently, the only way of operating a geothermal power plant in a flexible manner is to continue running the well field and bypassing the power generation facilities. This simply results in removing revenue while leaving operating costs the same, which is not economically feasible. In addition, this creates operational challenges associated with reinjecting fluid that remains at elevated temperatures, along with geochemical issues, and scaling issues.

Controlling fluid injection rates and pressures in the injection well, as well as controlling fluid production rates, production pressures and geothermal reservoir pressure, may be used to store energy in the geothermal energy reservoir so that the energy may be extracted at a later time, thereby shifting energy generation on-demand to a desired period that is economically more favorable. The electricity generation and electricity consumption profile can be controlled to improve the value of geothermal energy production, such as by producing energy during high-demand periods (e.g., nights) rather than lower demand periods (e.g., days) or by concentrating parasitic load requirements during periods of low energy prices.

In addition, systems and methods may be used to store energy in the subsurface geothermal reservoir as a pressurized fluid or as elastic potential energy in the subsurface formation, which can be released on-demand in a way that results in a flush production period of relatively high flow rates and associated power generation. This will generate higher market value because by time-shifting the production, rather than simply foregoing generation as previously described, power can be generated at more valuable times rather than simply throwing the energy away. In addition, it may be possible to make use of the power required to run injection pumps (typically thought of as parasitic loss) in a way that is financially beneficial to the geothermal operator and also improves grid reliability. This means flexibility can be added as a feature to geothermal power production with minimal loss of production, increasing the market competitiveness and making geothermal an ideal resource to achieve deep decarbonization.

Current geothermal systems are able to control power generation only by maintaining geothermal fluid flows into an and out of the geothermal reservoir and simply bypassing the fluid around the power generation equipment. While ramping down power generation in this manner reduces power output, it also represents a loss in revenue due to the energy wasted by bypassing the power generation equipment while still maintaining fluid flows and therefore still incurring cost to run the system. Shutting down injection or production wells to reduce operating costs is a challenge since restarting the wells can often be difficult. In an increasingly competitive power market, reducing revenue while still maintaining cost is not a formula for success.

FIG. 1 shows an example of a geothermal well system 100. Here, the well system 100 is a triplet well system that includes a pump 102 that pumps fluid such as water with or without proppant into a central injection well 104 that has a vertical portion and a horizontal portion. A gas such as carbon dioxide optionally may be included with the fluid. The horizontal portion extends across a geothermal energy source such as a rock region that stores heat and therefore is a geothermal energy reservoir.

Spanning either side of the horizontal portion of the injection well 104 are two production wells 110, both having a horizontal portion that extends across the geothermal energy source and both also having vertical portions that extend from the horizontal section upward to the surface.

The injection well 104 and the production wells 110 may be connected by hydraulic connection to create a confined reservoir system. This connection and confined reservoir system may prevent large-scale fluid leakoff (e.g., some leakoff may occur, but the pressure may be substantially maintained). This confined reservoir system with a hydraulic connection may be accomplished in a number of ways. One example technique includes hydraulic stimulation in a low-permeability formation via fractures as described below. In another example, a permeable geothermal formation may be identified, and used with a well placement pattern of injection wells and production wells installed with hydraulic potential fields and fluid flow fields that arise during well operations. The hydraulic potential fields and fluid flow fields cause artificial flow boundaries to form that prevent fluid leakoff in this example. In yet another example, a bounded geothermal formation may be identified, wherein the boundaries may be natural geologic features such as faults, and used with a geothermal energy system of injection and production wells. The geothermal reservoir boundary in this example prevents fluid leakoff. Combinations of these approaches may be used.

Connections 108 in the geothermal energy source fluidly, hydraulically, or otherwise via pressure communicatively couple the horizontal portions of the injection well 104 and the production wells 110. In an example, the connections 108 may include fractures, such as those that may be naturally occurring, or the fractures may be created using hydraulic stimulation techniques known in the art. Example fracture hydraulic stimulation treatment techniques include plug-and-perforate style treatments, sliding sleeve style treatments, open-hole packer style treatments, and diverter style treatments. Fluid injection via the injection well 104 is introduced into the geothermal energy source, and the fluid then flows through the connections 108, and is removed from the geothermal energy source with the horizontal portions of the production well 110. The hydraulic connections between the connections 108 (e.g., fractures) and the injection well 104 and production wells 110 are fairly strong and well controlled, so substantially all fluid injected into the geothermal energy source is removed and any leakage is minimal and easily measurable.

In another example, the connections 108 include hydraulic potential fields and fluid flow fields that cause artificial flow boundaries to form that prevent fluid leakoff between the injection well 105 and the production wells 110. In yet another example, the connections 108 include aspects of a geothermal reservoir boundary in to prevent fluid leakoff. These connections 108 are configured for tight control of the system 100, as will be discussed herein, which allows novel operating strategies.

An optional pump 112 at the surface or an optional downhole pump may be used to help remove the fluid from below the surface. As the fluid is injected into the geothermal energy source and passes through the connections 108, the fluid absorbs energy in the form of heat and thus fluid removed from the production well carries the heat with it. This heated fluid is pumped out of the production well and then the heat is used to produce power such as electricity with a generator such as a steam turbine, Organic Rankine Cycle turbine, other turbine, or other electricity generator 114. The electricity may then be transferred to the grid 116 for distribution. Optionally, in any example, it can be beneficial to use the heat directly for various purposes rather than generating electricity such as in agriculture applications.

By controlling both the injection pressure and production backpressure in a geothermal well system such as shown in FIG. 1, the parasitic load and power generation profiles can be managed to effectively shift electricity production to achieve high-efficiency energy storage. A flush production period of significantly increased flow and power generation may be obtained. One example of this includes operating the system flexibly in a manner that shifts the generation from low-demand periods (e.g., days) to peak-demand periods (e.g., nights) where energy prices are higher.

Use of a multistage well completion design with downhole fiber optics for real-time flow monitoring may provide benefits in terms of reservoir performance and management.

A load-shifting operational strategy is controllable and dispatchable, which is a valuable characteristic in competitive energy markets that include a large contribution from variable generation sources like solar and wind. For example, this approach could be useful in markets where a rapid demand response must be met in the evenings as load increases and generation from solar fades, requiring fast ramping, flexible resources to quickly increase electricity generation. Because geothermal power plants can be designed to emit zero carbon or other harmful emissions, the ability to generate power on-demand 24 hours a day, 7 days a week is increasingly important in markets with renewable energy portfolio standards or other carbon emissions reduction goals.

Use of a system such as in FIG. 1 that has horizontal wells connected hydraulically in the fracture example creates a very tight connection between the injection and production wells, effectively providing more control over the production and injection well behavior. For example, the production well flow rates are very strongly connected to the flow rate and pressure conditions on the injection well side, which allows the production rate to be controlled by changing the pressure or flow rate on the injection wells. Injection pressure may be greater than the pressure required to cause mechanical separation of the fracture walls in the geothermal energy reservoir, and this may facilitate injection of fluids from the injection well into the rock formation. Similarly, if backpressure is applied on the production well side by choking the production well, it becomes harder to pump fluid down the injection well, thereby increasing the power consumption rate on the injection pumps. Choking may be achieved by obstructing the well, closing or partially closing a valve, or other techniques known in the art. The valves and pumps used to control flow rates and pressures can be controlled manually or controlled automatically by software and electronic systems.

The tightly controlled system may have other benefits. For example, the fluid migration path between the injection and production wells is very well understood and highly predictable, as it travels predominantly through the fractures that connect the wells. The fluid leak off rate from the fractures is typically very small and can be measured. Therefore, if there is net positive injection (for example when injection rate is higher than the production rate) the fluid will compress and the reservoir pressure will build. As the pressure builds, the fractures tend to dilate, in turn doing work against the subsurface in-situ stresses that act to push the fracture walls together. This work is effectively stored energy in the form of hydraulic pressure or elastic potential energy in the subsurface geothermal reservoir. Production well flow rates depend on the level of pressurization in the reservoir—the higher the pressure, the higher the flow rate.

Figure 2:
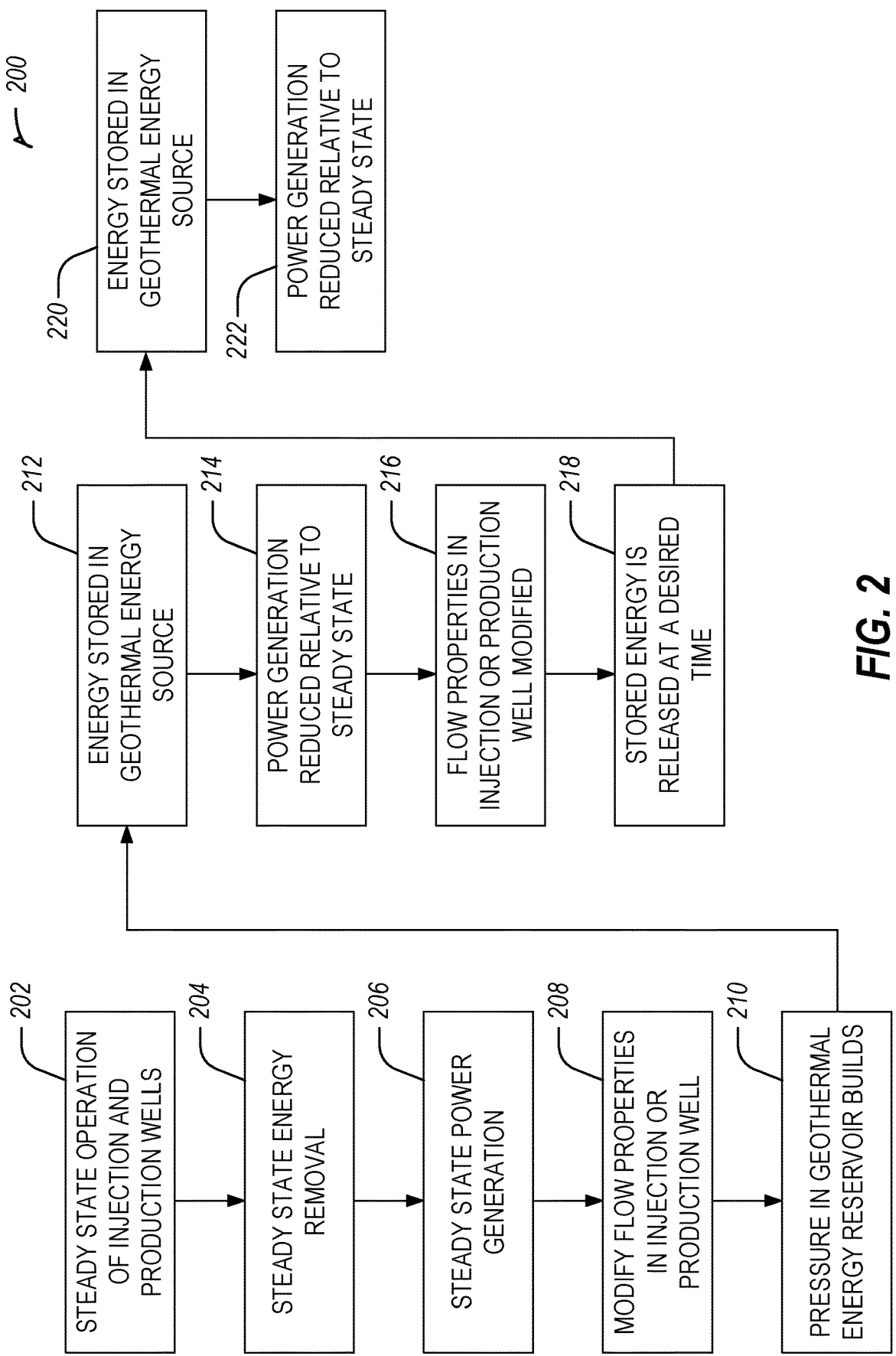
FIG. 2 shows an example of a process of controlling a geothermal well system.

FIG. 2 shows an example of a process of controlling a geothermal well system as described above, schematically in flowchart 200. Here, injection wells and production wells such as those shown in FIG. 1 are operated in a steady state 202 allowing steady state energy removal 204 from the geothermal energy source and steady state power generation 206 such as in the form of electricity. When desired, flow properties of the injection or production wells may be modified 208 in order to build pressure in the reservoir 210 and store energy in the hydrothermal energy reservoir 212 by increasing hydraulic pressure. This may be achieved by injecting fluid while reducing production flow rates (or even shutting the production wells in completely), so power generation, such as electricity production, is reduced or stopped 214 relative to the steady state power generation 206. The energy required to pump the fluid down the well and into the reservoir is stored as hydraulic pressure. In some examples, the energy is stored in the work done to deform fractures, deform pores in the reservoir, compress reservoir fluid, or the like. When desired, the excess/stored energy can then be released by opening the production wells such as by restoring full flow capacity, or otherwise modifying injection and production well flow properties 216. The energy stored in the reservoir, such as the excess reservoir pressure, can be released 218, and this causes a boosted production rate (also referred to as a flush production rate) 220 for an extended period of time, ultimately leveling back off to a "steady-state" level 222. The steady-state production rate is equal to the injection rate less any fluid that leaks off in the formation. This cycle may be repeated as desired. By moderating the injection pressure, injection flow rate, production backpressure, production flow rate, and reservoir pressure, it is possible to deliver a wide range of power generation and power consumption profiles.

Gross power generation is a function of the production well flow rate and the enthalpy of the produced fluid. Power consumption is a function of the injection pressure and injection flow rate and the power required to circulate fluid in the power plant system (the Organic Rankine Cycle heat exchanger system), sometimes also called the parasitic load. Net power is the difference between the gross power generation and the power consumption. It is also possible to power consumptive loads such as the injection pumps with external systems, such as solar power, battery storage, or solar plus battery storage, which can prevent some of the parasitic loss.

Figure 3A:
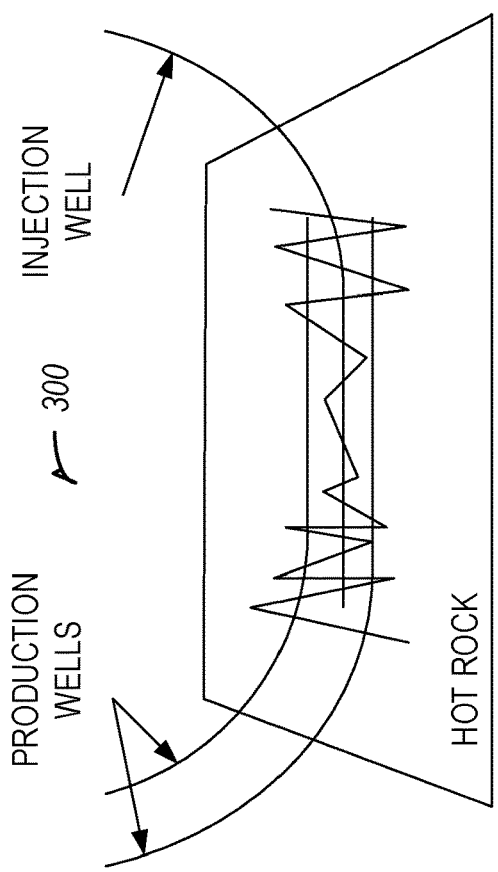
FIGS. 3A-3C show an example of a geothermal well system and modeling of in-reservoir energy storage and time shifting or on-demand energy production.

FIG. 3A illustrates modeling of the in-reservoir energy storage and time shifting or on demand energy production concept described above. A geothermal energy system 300 is substantially the same as the system 100 shown in FIG. 1 and includes a horizontal injection well and two offset horizontal production wells. The injection well is fluidly, hydraulically, or otherwise via pressure communication coupled with the production wells via fractures in the geothermal energy reservoir (e.g., a rock formation), a permeable porous media, or the like, and the confined reservoir behavior is caused via low-permeability formation rock surrounding fractures, artificial flow boundaries caused by well patterns, reservoir boundaries, or the like. As described above in FIG. 2, injection and production well flow parameters are modified from steady state to store energy in the geothermal energy source. Pumps on the injection wells are used to pump a fluid downhole. During times of low-value energy, the production wells are throttled back to reduce the production flow rates in a "shut-in" phase, resulting in an increased rate of pressure buildup in the geothermal reservoir. The pressure buildup can be measured at the injection well, downhole, and/or at the production well. The power consumed by the electric pumps on the injection wells is effectively stored in the reservoir as hydraulic pressure and/or elastic potential energy. During times of high energy prices, the production wells are opened, releasing the excess hydraulic energy that built up during the shut-in phase as a flush-production period of high flow rates and associated high power generation. As the fluid travels from the injection well, through the geothermal formation, and into the production well, the fluid absorbs heat from the formation thereby increasing the fluid enthalpy and harvesting thermal energy from the geothermal formation.

Figure 3B:
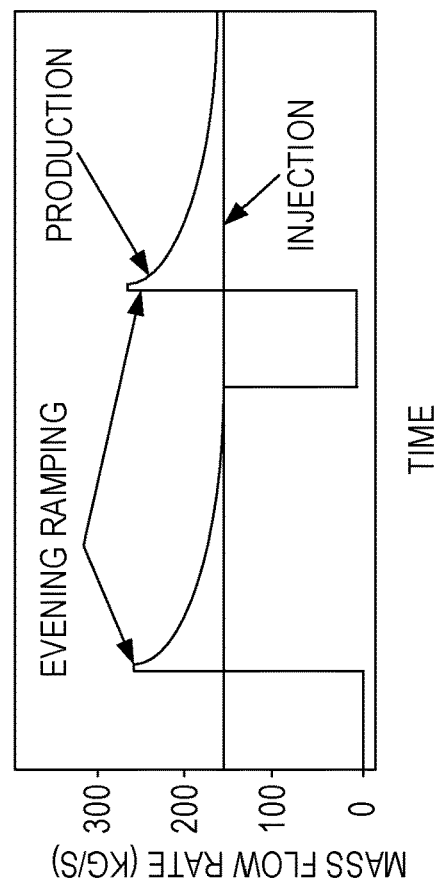

FIG. 3B shows constant operation of system 300 in FIG. 3A where the injection well introduces fluid into the geothermal energy reservoir while flow from the production well is reduced or even shut off so production flow is low or zero, and then when the production well is re-opened, flow surpasses the steady state of the injection flow rate for a period of time and then tapers back down to the steady state production flow rate, which is more or less equivalent to the injection rate (assuming minimal fluid leakage in the system). This creates a flush period where energy production such as electricity generation is greater than steady state until the system equilibrates and comes back to a steady state. After production flow reaches steady state and flows at that rate for a desired period, the cycle may be repeated.

Figure 3C:
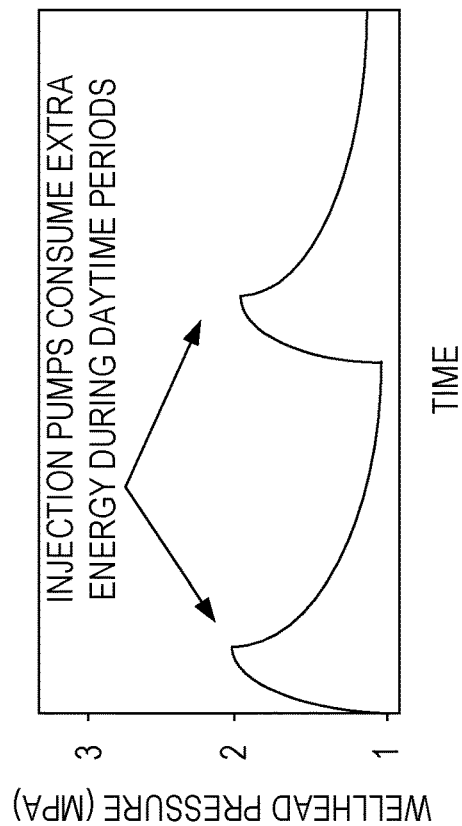

FIG. 3C shows the wellhead pressure in the system and shows pressure building in the system 300 as injection continues but production is throttled back. Pressure builds until the production well is re-opened; then pressure drops back down to steady state and the cycle may be repeated.

Figure 4A:
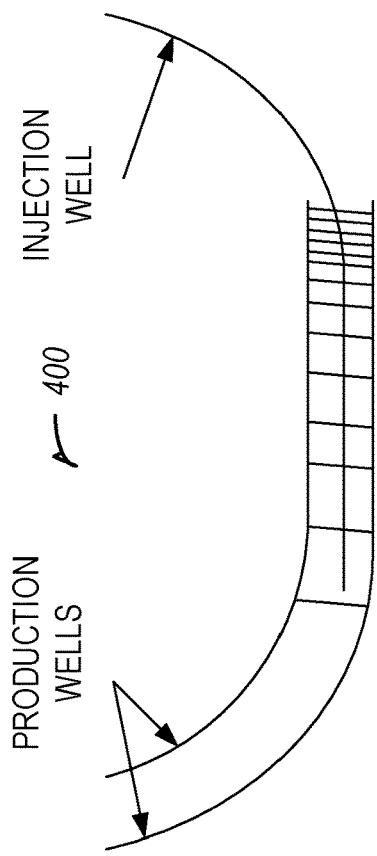
FIGS. 4A-4C show another example of a geothermal well system and in-reservoir energy storage and time shifting.

FIG. 4A shows a geothermal energy system 400 substantially the same as previously described in FIG. 1 and FIG. 3A. System 400 includes a horizontal injection well and a pair of horizontal production wells that are offset from the injection well. The production wells and injection well are fluidly, hydraulically, or otherwise via pressure communication coupled together via fractures in the geothermal energy reservoir (e.g., a rock formation), via artificial flow boundaries, via a geothermal reservoir boundary, or the like.

Figure 4C:
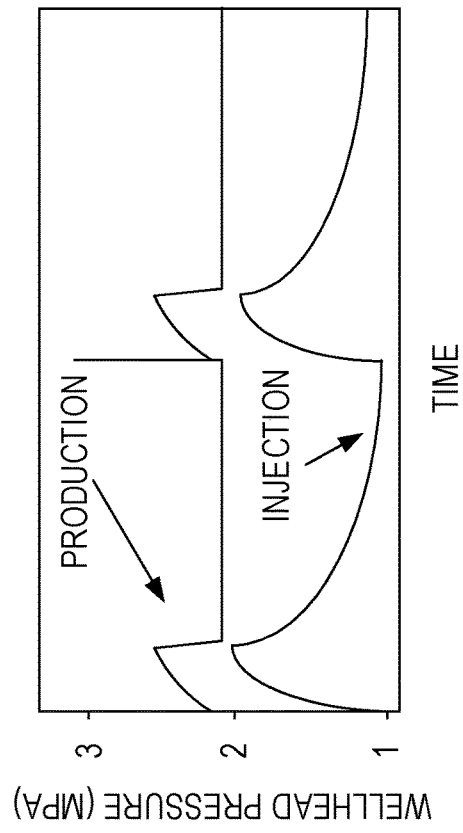
Figure 4B:
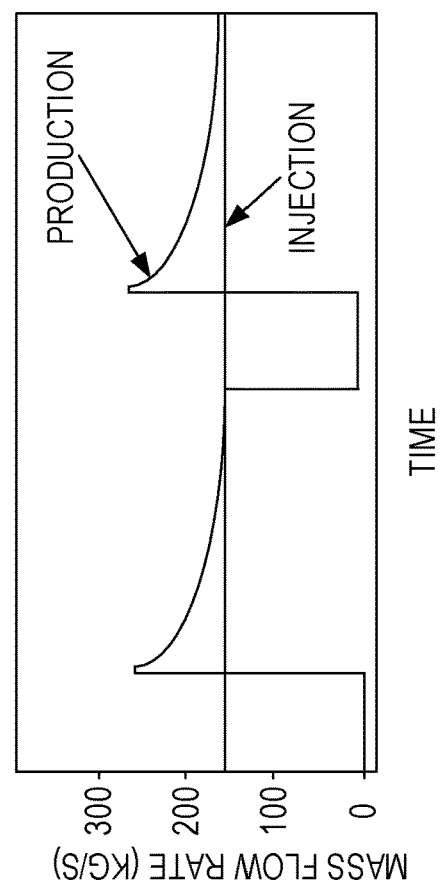

FIGS. 4B-4C illustrate modeling of flow rates and wellhead pressures when the techniques described above for energy storage and time shifting energy production are used. These simulations demonstrate that that injection and production well conditions can be controlled to effectively store energy as hydraulic pressure in the geothermal reservoir and release that energy through the form of a flush-production period of increased flow rates and power generation.

FIG. 4B shows injection flow rate constant while production flow rate is reduced or completely turned off for a desired period of time. When desired, production is re-opened and production flow initially spikes and is higher than the steady state injection flow rate. This flush period allows a flush period of electricity generation. In this case, the production flow rate and energy production are capped at a limit set by the capacity of the geothermal power plant. A period of relatively steady production at the capped rate occurs until pressure drops sufficiently. Production flow then gradually reduces until it reaches steady state, which is substantially the same as the injection flow rate (less any fluid leakage). Injection and production flow is continued as long as desired and then the cycle is repeated.

FIG. 4C shows the corresponding wellhead pressure for the injection well and the production well. When the production flow is reduced or turned off, both injection and production wellhead pressures increase as shown. When production well flow is opened up, then both pressures decrease back to a steady state level. This cycle may be repeated. FIGS. 4B and 4C show effective control of the geothermal energy system. In FIG. 4C, the injection wellhead pressure is lower than the production wellhead pressure. This is the result of a thermosiphon effect caused by injecting cold, dense fluid and producing hot, less dense fluid. The thermosiphon effect can be taken advantage of to reduce overall pumping requirements needed to circulate fluid through the wells and the formation.

FIGS. 5A-5D show injection pressure, injection rate, and production rate profile over the course of a 48-hour period. The associated gross power generation, power consumption, and net power generation over the course of the 48-hour period are also shown for a geothermal system such as those previously disclosed herein.

In FIG. 5A, injection flow rate is held constant over the time period while production output is initially reduced or turned off for approximately six hours. Production flow is then restored, and flow increases above the steady state injection flow rate and then gradually declines until it reaches the steady state injection flow rate (less fluid leakage). This process is repeated again over the 48-hour cycle.

FIG. 5B shows the corresponding pumping pressure on the injection well that corresponds to the injection and production well activity shown in FIG. 5A. While production flow rate is reduced or turned off, pumping pressure increases until it hits its maximum value when production flow is restored. The pumping pressure then declines back down to the steady state pressure. This process is repeated again over the 48-hour cycle.

FIG. 5C shows the power generated and consumed by the cycle shown in FIG. 5A. Power consumption remains generally constant with some peak regions that correspond to the increase in injection pressure, which requires greater energy, until production is restored and the injection pressure decreases. Power consumption is generally attributed to the power required to operate the injection wells, which are substantially constant over the 48-hour time period except for the slight increase due to the injection well pressure increase. Power generated by the heat removed from the geothermal reservoir is in the form of electricity and is initially zero or very low while the production flow is reduced or turned off. Then, when production flow is restored, power generated increases to its maximum level and then slowly decays back town to a steady state level and then drops back to zero or near zero when production flow is reduced or turned off and the cycle is repeated.

FIG. 5D shows the net power generated by the system. Net power is less than zero initially when production is turned off or reduced since power is required to run the injection wells and no (or very little) power is being generated. Then, when production flow is restored, net power increases to its maximum and slowly declines back down to a steady state value and then drops back down to below zero when production is turned off or reduced significantly again. The cycle is then repeated again during the 48-hour cycle. Periods when net power is negative reflect periods where energy is being stored in the geothermal reservoir.

FIGS. 6A-6D show load profiles for an alternative injection/production scenario using a geothermal system such as any of those described herein. They include injection pressure, injection rate, and production rate profile over the course of a 24-hour period. The associated gross power generation, power consumption, and net power generation over the course of the 24-hour period are also shown for a geothermal system such as those previously disclosed herein.

In FIG. 6A, injection flow rate is varied over time in roughly a square wave pattern. When injection flow rate is at its lowest, production flow rate decreases from its maximum until injection flow is increased and then production flow increases to its maximum. When production flow is reduced or turned off, injection flow flattens out and becomes constant. Production flow is then restored and injection flow drops to a constant level and production flow is constant for a period and then drops off. The cycle is then repeated.

FIG. 6B shows the corresponding injection pressure associated with the cycle in FIG. 6A. Initially, as production flow decreases and injection flow is constant, injection pressure decreases until production flow is restored and injection flow is raised, then injection pressure continues to increase toward a maximum and then declines until the beginning of the next cycle.

FIG. 6C shows the power generated and consumed by the cycle of FIG. 6A. Here power consumed rises from zero or virtually zero, spikes up when the injection flow rate spikes upward (the start of the square wave in FIG. 6A), continues to rise until it hits a maximum value, and then drops off abruptly and decays back toward zero or nearly zero; then this cycle repeats. The power generated decays from its maximum level and then spikes back to the maximum value when the production flow is restored and stays constant at that level until production flow is reduced or turned off and power generated drops to zero or nearly zero. When production flow is restored, power generated increases to its maximum value and is constant for a time until production flow is reduced and power generated declines. The cycle then repeats.

FIG. 6D shows the corresponding net power based on the cycle of FIG. 6A. Net power is positive during most of the cycle but is negative when production flow is reduced or turned off.

Figure 7A:
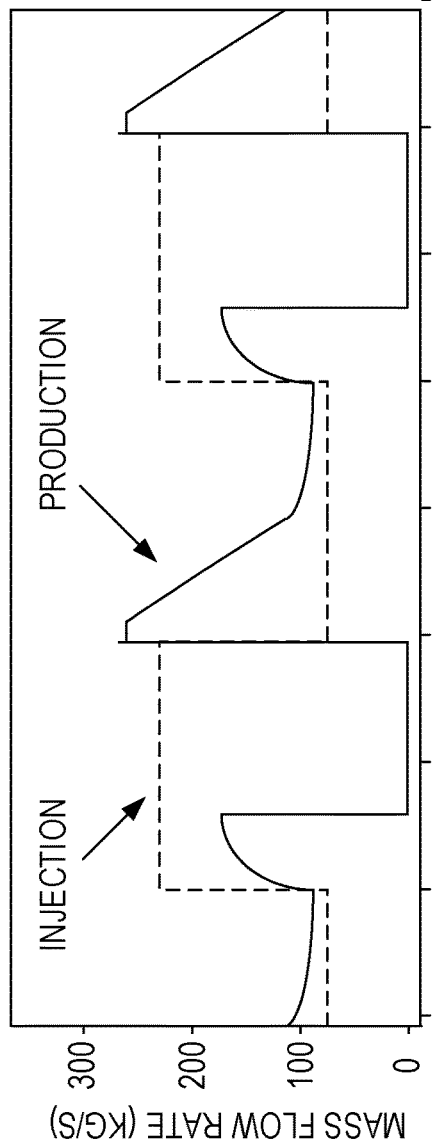
FIGS. 7A-7B show models of mass flow and wellhead pressure.
Figure 7B:
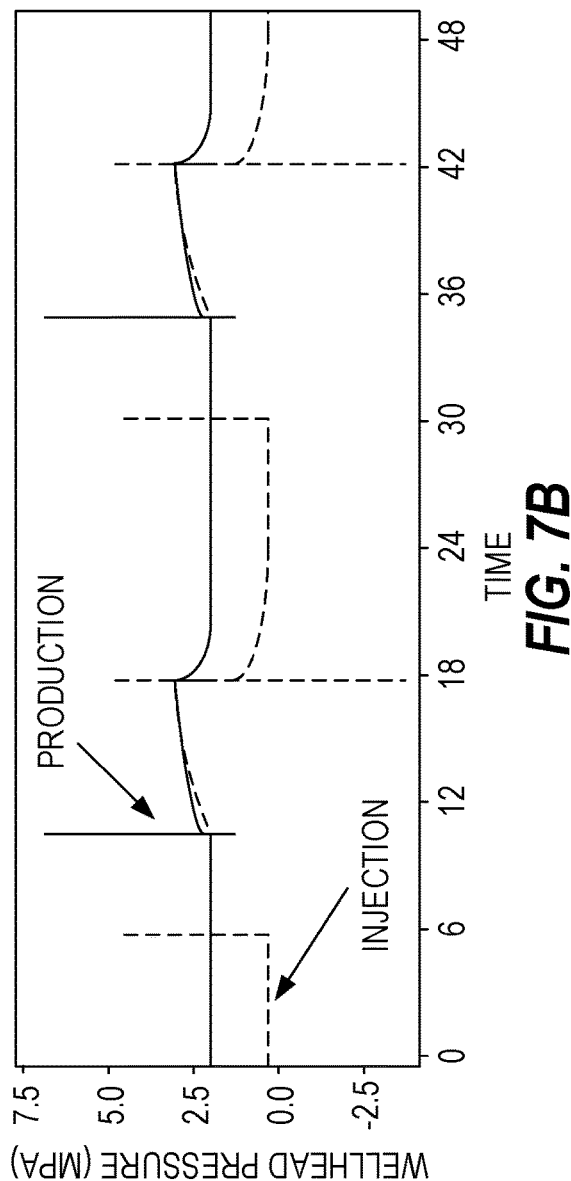

FIGS. 7A-7B show models of mass flow and wellhead pressure when injecting at 80 kg/s for 12 hours and 240 kg/s for 12 hours using a geothermal energy system such as those described above. Reduced injection is aligned with the ramp-up of production. These figures highlight the effect of increasing the flow rate on the injection well to near-instantaneously boost flow rates on the production well. In that manner, the power generation profile can largely be controlled by moderating the injection well flow rate and pressure.

In FIG. 7A, injection mass flow cycles between a low mass flow of about 80 kgs/s and a high mass flow of about 140 kgs/s in a square wave pattern. The production mass flow initially decays from a maximum until the injection mass flow rate is increased and then it increases until it is turned off or significantly reduced and drops to nearly zero, where it stays constant while injection mass flow is at its maximum constant value. Production mass flow is then restored and spikes up higher than injection mass flow; it slowly decays back down until injection mass flow spikes up again and the cycle repeats.

FIG. 7B shows the wellhead pressure associated with the cycle described above in FIG. 7A. Here, injection wellhead pressure is initially constant at nearly zero and then spikes up when injection mass flow rate spikes up. Injection wellhead pressure then drops back down and is constant until production mass flow rate is turned off or significantly reduced so the injection wellhead pressure rises to a maximum and then drops to a negative value when production mass flow is restored. Injection pressure then spikes back up and decays slightly and then is constant until the cycle is repeated. Production wellhead pressure is initially constant then spikes up when production mass flow is reduced or turned off. It then drops down and slowly increases again until production mass flow is restored and then production wellhead pressure decays slightly and holds a constant value until the cycle repeats again.

Figure 8A:
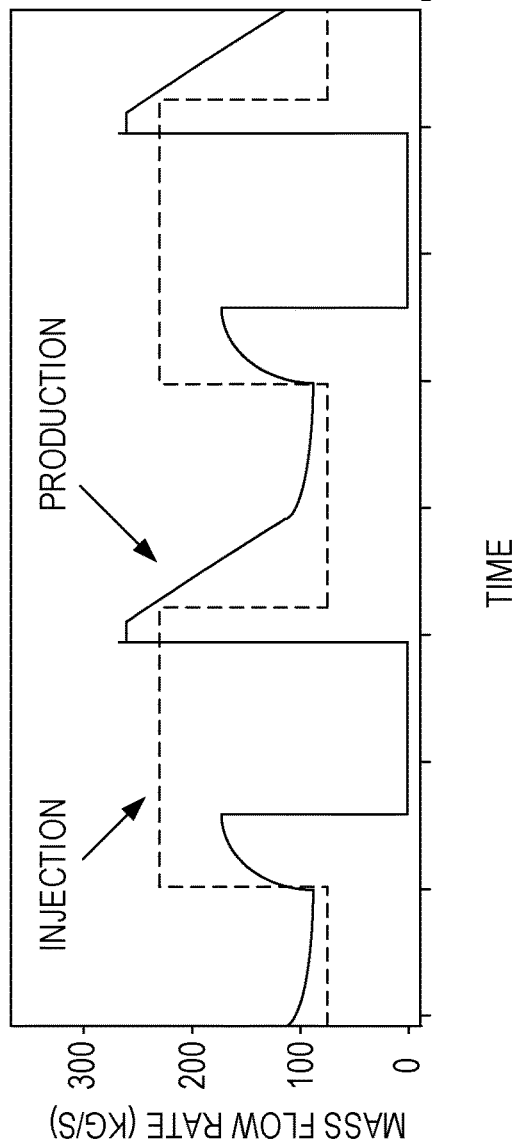
FIGS. 8A-8B show models of mass flow and wellhead pressure.
Figure 8B:
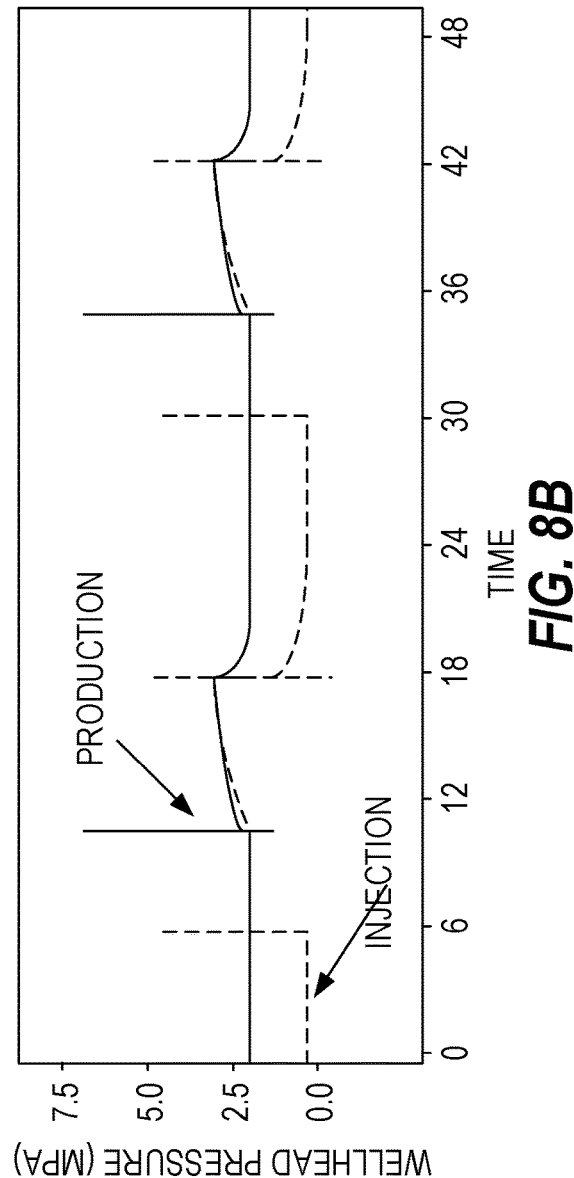

FIGS. 8A-8B show models of mass flow and wellhead pressure using a geothermal energy system such as those described previously. Here injection is at 80 kg/s for 12 hours and 240 kg/s for 12 hours. Reduced injection is offset with the ramp-up of production by a few hours.

In FIG. 8A, injection mass flow rate is at the lower constant value and then increased in a step function to its higher constant flow value where it is held for a desired time period before being reduced back down to the lower constant value. During the lower constant injection mass flow rate, production mass flow rate falls from its peak value until it is substantially the same as the lower injection mass flow rate. When injection mass flow rate is increased, production mass flow rate also increases slightly until production flow is reduced or turned off until production flow goes to zero or nearly zero while the injection mass flow is constant at its higher value. Production mass flow stays at zero or the reduced constant value until production is restored and mass flow spikes upward to a value higher than the larger injection mass flow rate where it is held constant until injection mass flow is reduced; then production mass flow reduces slowly back down toward the injection mass flow rate and the cycle is repeated.

FIG. 8B shows the corresponding wellhead pressure for the mass flows used in FIG. 8A. When injection flow is at its low constant value, injection wellhead pressure is also at a low constant value. Injection wellhead pressure spikes up and then down when injection mass flow is increased and production mass flow is also increased. This drop is suspended when production mass flow is reduced to zero or nearly zero; then injection wellhead pressure slowly increases and drops slightly and then spikes to zero or nearly zero when production mass flow is at its peak and injection mass flow is at its lower constant value. Injection wellhead pressure increases slightly and then drops until reaching a substantially steady state level and then the cycle repeats. Production wellhead pressure is initially at a low constant value then spikes upward when production mass flow is reduced or turned off, and then falls back down to a value slightly higher than the initial constant value. Production wellhead pressure increases slightly until the production mass flow is restored and then wellhead pressure decreases and decays back down to the constant low pressure and the cycle repeats itself.

Figure 9A:
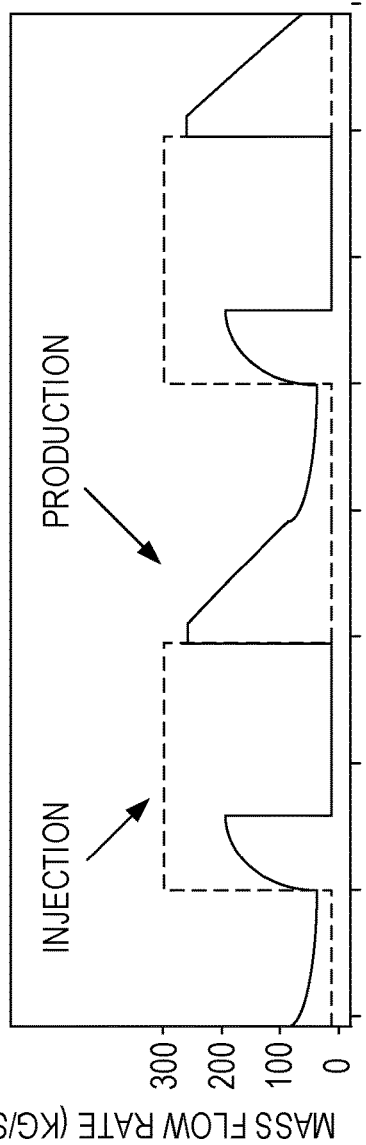
FIGS. 9A-9B show another pressure and flow rate model.
Figure 9B:
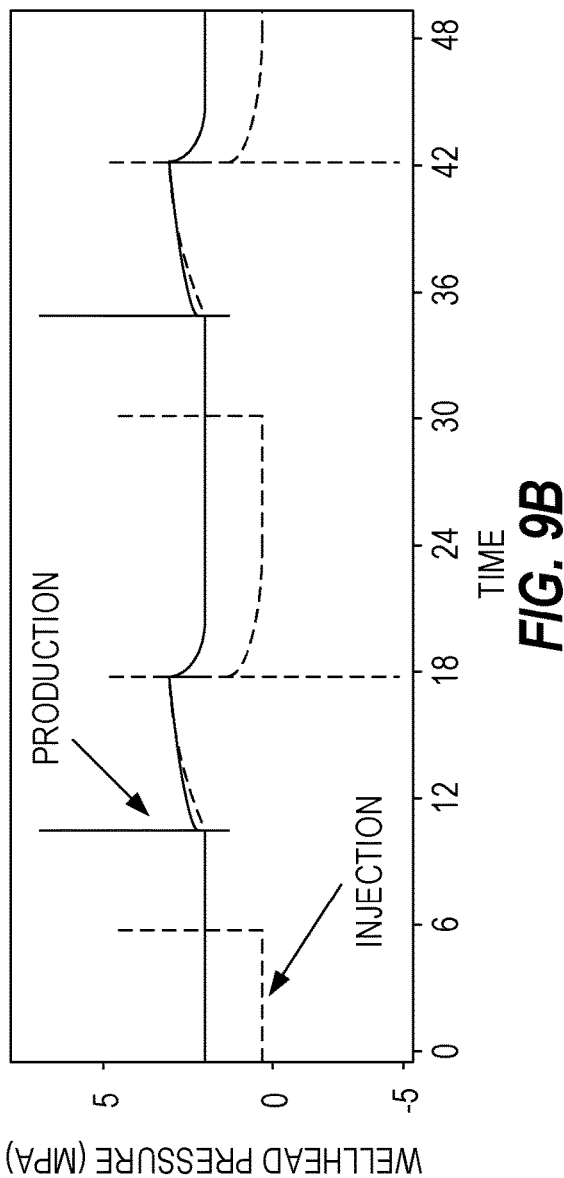

FIGS. 9A-9B show another pressure and flow rate model using a geothermal system such as any of those described above. Here, injection of the full amount of water is performed in a 12-hour period, and then injection is shut off.

In FIG. 9A, injection mass flow cycles between zero or nearly zero and a higher value in a square wave pattern. Production mass flow initially declines from a maximum value until the injection mass flow is increased, then production mass flow also spikes up and increases slowly until production mass flow is reduced or turned off. When production flow is restored, production mass flow spikes up to a higher maximum value and then decays down when injection mass flow is turned off or significantly reduced. The cycle then repeats.

In FIG. 9B, the corresponding wellhead pressure is shown for the cycle shown in FIG. 9A. Here, injection wellhead pressure is initially at a low point then spikes up when injection mass flow rate is increased. It drops down slightly and is constant until production mass flow is reduced or turned off and then injection pressure increases. When production mass flow is restored, injection wellhead pressure drops rapidly and then comes back and is substantially constant as production mass flow decays then spikes up when production mass flow is turned off or reduced, and the cycle repeats. Production wellhead pressure is initially constant then spikes up when production mass flow is reduced or turned off and then drops back down and increases slightly until injection mass flow is reduced and production mass flow is restored. Production mass flow drops slightly and then is constant until the cycle repeats.

Figure 10:
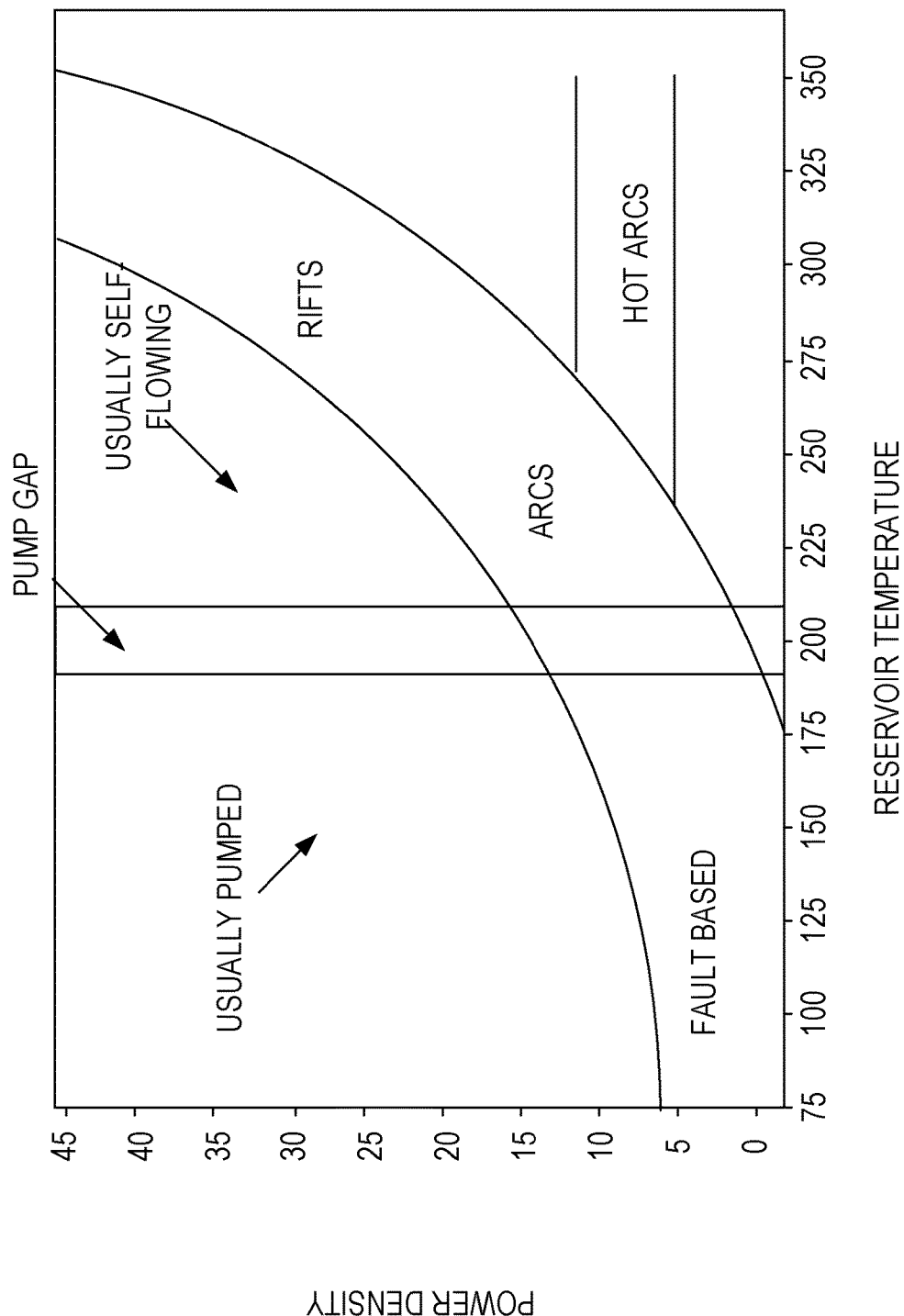
FIG. 10 shows power density and reservoir temperature characteristics for most of the known actively producing geothermal fields.

FIG. 10 maps power density and reservoir temperature characteristics for most of the known actively producing geothermal fields worldwide. There are zero active fields operating in the temperature window of approximately 175 degrees C. to approximately 210 degrees C. because resources at higher temperatures typically have low enough fluid density that the production wells can flow on their own, typically referred to as "self-flowing wells." Resources such as those in the "pump gap" shown in FIG. 10 where temperature is lower result in fluid densities that are too high to allow the fluid to self-flow and thus downhole pumps are needed on the production wells to lift the fluid. However, there are no commercially available pumps that operate with sufficient flow rates at temperatures above 175 degrees C. and even if they were commercially available, they would be costly to operate and have reliability issues. The systems described herein provide such tight fluid connections with minimal leakage between the injection well and the production well that production flow rates may be changed by controlling fluid pumping on the injection well side which eliminates the need for downhole pumps and thus geothermal systems and methods disclosed herein may be used for energy production for fields within the "pump gap" resource characteristics where the resource temperature is between approximately 175 degrees C. to approximately 210 degrees C. The systems and methods disclosed herein may also operate in other temperature ranges, such as 120 degrees C. to 225 degrees C.

Figure 11:
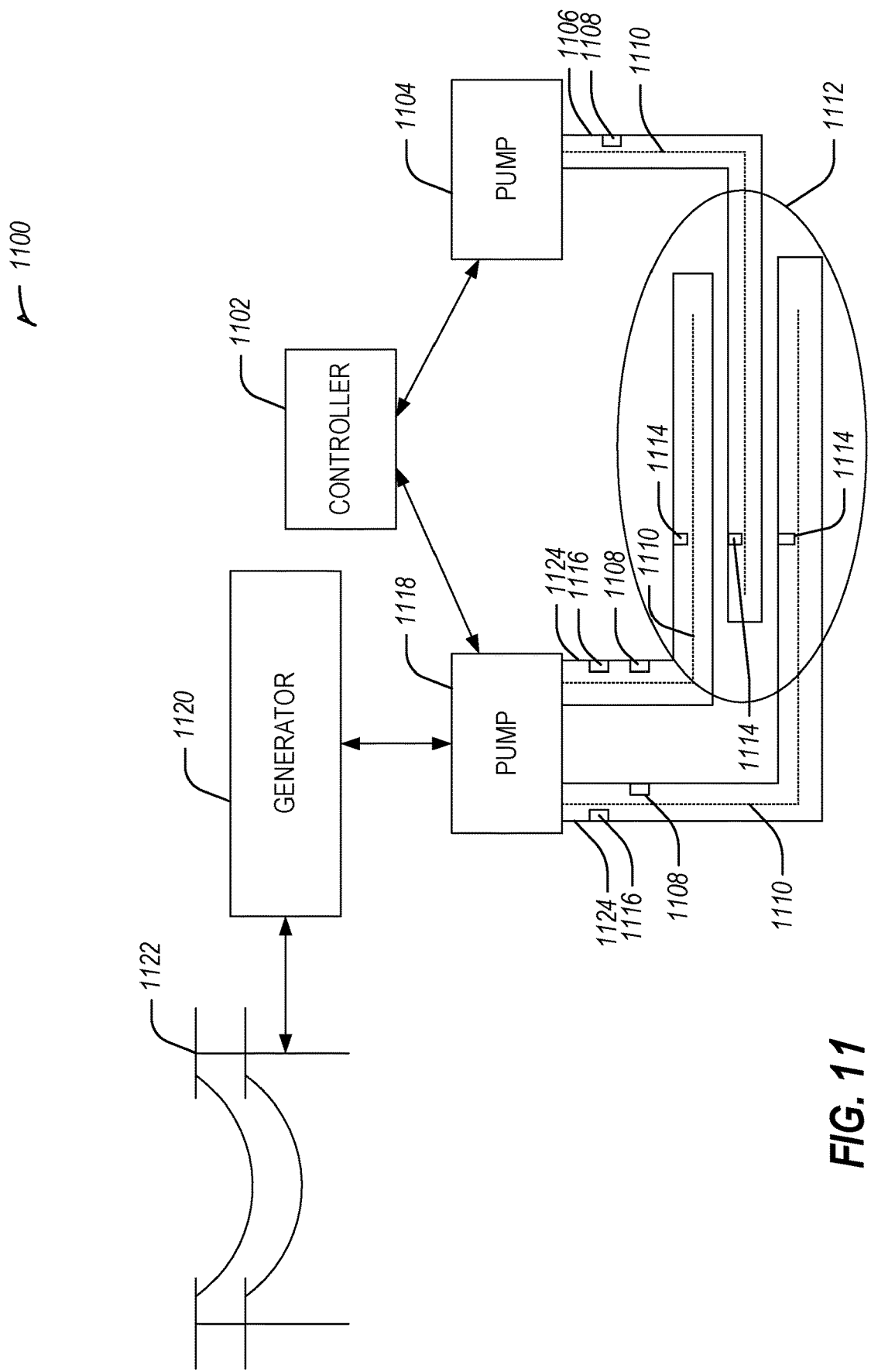
FIG. 11 shows an example of a geothermal well system.

FIG. 11 shows an example of a geothermal well system 1100 similar to that shown in FIG. 1 but with optional features shown. Any of the geothermal systems and methods described herein may use any or all of the optional features shown in FIG. 11.

The geothermal well system 1100 includes an injection well 1106 that has a vertical section and a horizontal section that extends through the geothermal energy reservoir 1112. One or more production wells 1124 have a vertical section and a horizontal section that extends through the geothermal energy reservoir 1112. Here, there are two production wells 1124 that are offset from the injection well 1106. Fractures, artificial flow boundaries, =a geothermal reservoir boundary, or the like in the geothermal energy reservoir 1112, are used to fluidly, hydraulically, or otherwise via pressure, communication couple the injection well 1106 and the production wells 1124. A pump 1104 on the injection well 1106 may be disposed on the surface or it may be a submersible pump 1114 disposed in the injection well 1106, or both may be used in order to introduce cold fluid into the geothermal energy reservoir 1112. As the cold water passes through the geothermal energy source, it absorbs heat; then an optional surface pump 1118, or an optional submersible pump 1114 or an optional line shaft pump, or both, may be used to pump the heated fluid out of the geothermal energy reservoir 1112 to the surface where a generator 1120, such as an Organic Rankine Cycle turbine or other turbine, uses the heat to generate power in the form of electricity, which can then be sent to the power grid 1122 for distribution and consumption.

The geothermal energy system 1100 may optionally include sensors such as fiber optic sensors 1110 in any portion of the injection well 1106 or any portion of the production well 1124 to act as a sensor for flow, acoustic, temperature, strain, or pressure monitoring. Other sensors may be used with or without the fiber optic sensors 1110.

The geothermal energy system 1100 may optionally include artificial lift systems 1108 to facilitate injection flow or production flow. In an artificial lift system, a gas is injected into the production well. For example, the gas may be injected at the bottom of the production well which causes a reduction in the overall effective fluid density in the column of fluid in the well. This allows the fluid to flow up the well more easily than the original fluid density. This may be helpful in allowing complete shutdown of the production well, since without the artificial lift system, it can be very challenging to restart a geothermal energy system once stopped, which is why the injection well is typically run constantly and operators are reluctant to shut down the production well.

The geothermal energy system 1100 may optionally include choking elements 1116 which are shown in the production wells 1124 but in some cases may optionally be used in the injection well 1106. The choking elements 1116 may be in any section of the injection or production wells 1106, 1124 and reduce production flow and increase pressure in the system 1100, and they may be a valve or other mechanism for controlling flow and pressure.

A control system 1102 may be used to control pressures and flow rates and a controller in the control system 1102 may control operating parameters in real time. Moderation of the pressures and flow rates may be accomplished above ground from the earth's surface (e.g. from a well pad) that is above the geothermal energy reservoir 1112, and therefore the use of submersible pumps 1114 or line shaft pumps can be avoided. The above ground controller may control operating conditions predominately by using injection pumps that operate entirely on the earth's surface, thereby eliminating use of submersible pumps or line shaft pumps disposed in the production well. Examples of the operating conditions comprise one or more of injection rate, production rate, cross-well circulation rate, injection wellhead pressure, reservoir pressure, and production wellhead pressure.

The control system 1102 may be one or more mechanical valves that are operated manually, or they may be operated with a machine configured to receive a computer-readable medium storing computer-readable instructions. The instructions can execute any of the methods or processes described herein and they may be executed by computer-executable components integrated with an application, applet, host, server, network, website, communication service, communication interface, hardware/firmware/software elements of a user computer or mobile device, wearable device, smartphone, or any combination thereof. Control of other aspects of the systems and methods disclosed herein may be performed by a machine configured to receive a computer-readable medium storing computer-readable instructions. The instructions can be executed by computer-executable components integrated with devices, systems and methods described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In an example, a system comprising one or more computer-readable mediums stores instructions that, when executed by one or more computer processors, cause a computing platform to perform operations comprising those of the systems or methods described herein such as storing energy in the geothermal energy reservoir and time shifting energy production.

Figure 12:
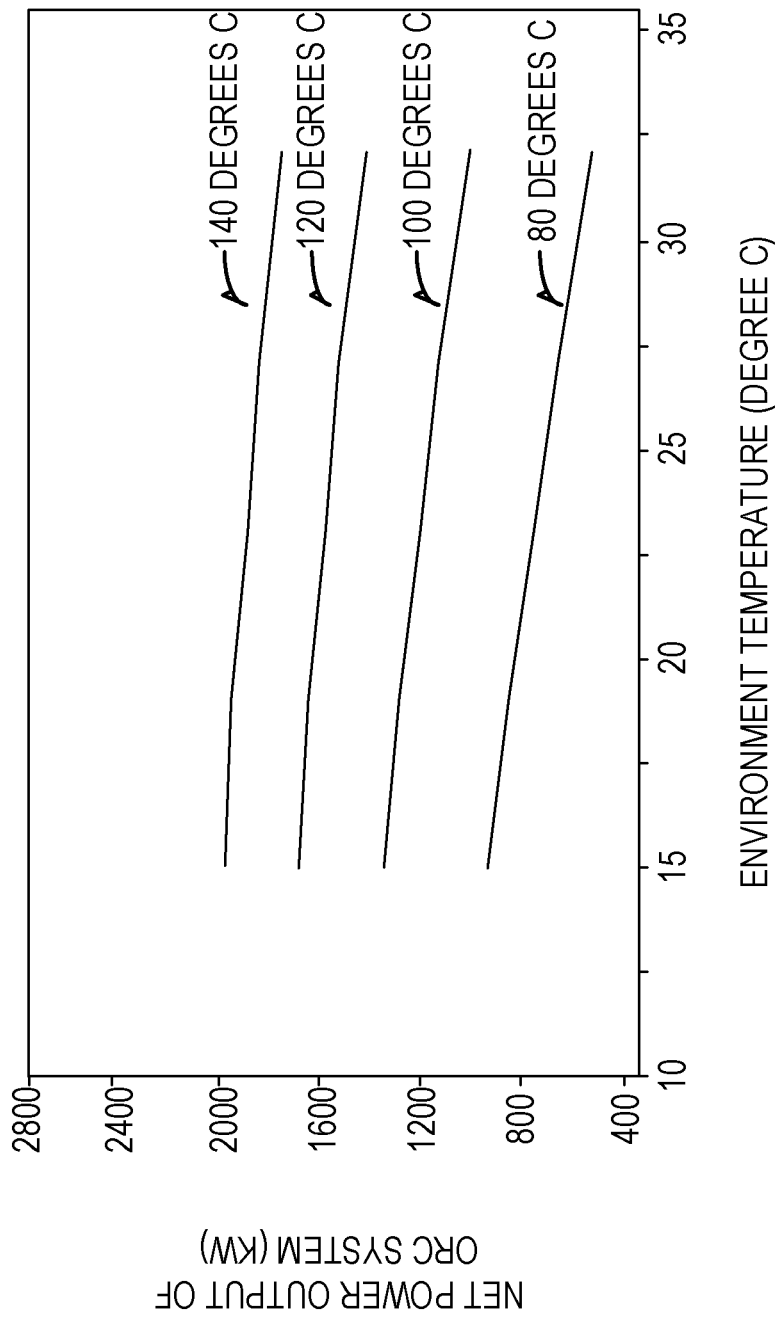
FIG. 12 shows example net electric power generation curves as a function of ambient air temperature conditions for various heat exchanger inlet temperatures for an Organic Rankine Cycle generator system.

FIG. 12 shows example net electric power generation curves as a function of ambient air conditions. FIG. 12 shows a typical net electric power generation curve over a range of typical ambient air temperature conditions. The geothermal fluid production rate may be constant, however a large amount of variability occurs due to inherent variability in the thermal-to-electric conversion efficiency of Organic Rankine Cycle power plants. The variable efficiency is caused by fluctuations (both daily and seasonal) in ambient temperature conditions.

Electricity that is generated from thermal energy recovered from produced fluid may use an Organic Rankine Cycle generator system. The Organic Rankine Cycle generator system may include a ramping rate during a charging or discharging period that is about 15% of nominal power plant capacity per minute. In an example, a charging period or discharging period may be optimized to take advantage of inherent variability in thermal-to-electric conversion efficiency of the Organic Rankine Cycle generator system. The inherent variability is caused by fluctuations in local ambient air temperature conditions (e.g., daily or seasonally). In some examples historic temperature measurements are used in optimizing the charging or discharging period.

Figure 13B:
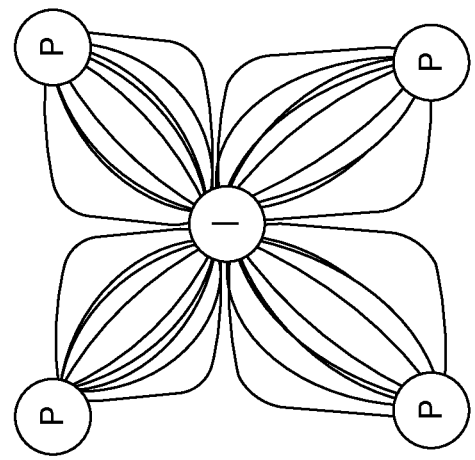
FIGS. 13A-13B show an example well pattern and related streamlines.
Figure 13A:
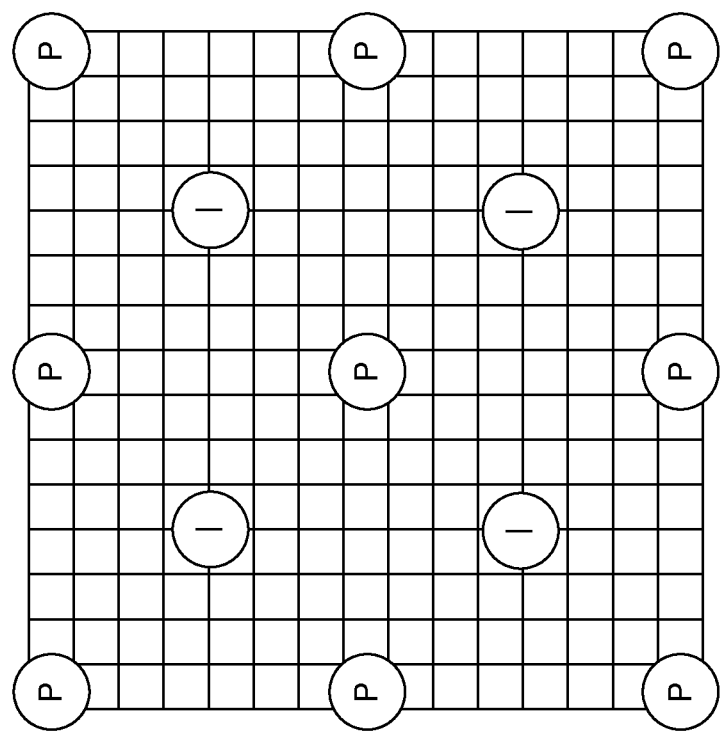

FIG. 13A shows an example well pattern. The example well pattern includes a "five-spot" well pattern. One injection well is surrounded by four producer wells. The pattern is repeated multiple times (in this figure, there are a total of four "five-spots", with overlap). In an example, the injection well is considered the center of the pattern, and the production wells flank the injector. This is a common well pattern for the oil and gas waterflooding process. In some examples the injectors and producers may be inverted. Although the "five-spot" well pattern is shown, other example patterns, such as a seven-spot (e.g., six injection wells arranged in a hexagon surrounding a production well, or vice versa), a nine-spot (e.g., eight injection wells arranged in a square, rectangle, or irregular polygon around a production well, or vice versa), or the like may be used.

In FIG. 13B, the "streamlines" or "flow paths" are shown for one of the "five-spots." Between the injectors, artificial flow barriers develop, otherwise called no-flow boundaries. This results from symmetry and superposition of the pressure fields for all wells. This is one example of how a "confined reservoir" can be engineered with a well pattern.

In some examples, well patterns create artificial no-flow boundaries. However, even with these no-flow boundaries, the well patterns may be effective (often times it is not possible to create a perfect system due to natural heterogeneity in the subsurface). Instead, even with no-flow boundaries, the well pattern may be sufficient for the systems and techniques described herein.

Figure 14B:
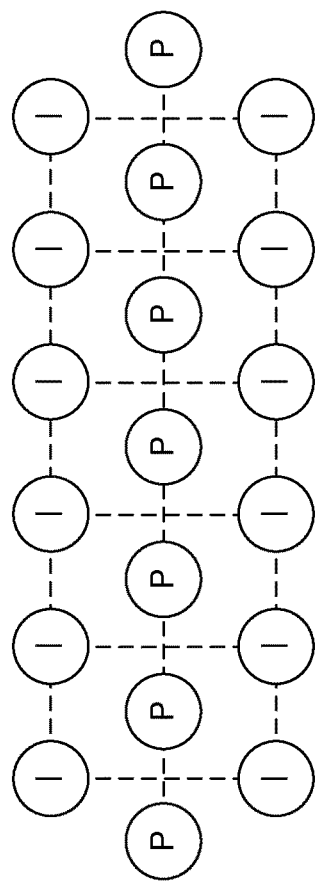
FIGS. 14A-14C show some example well patterns.
Figure 14A:
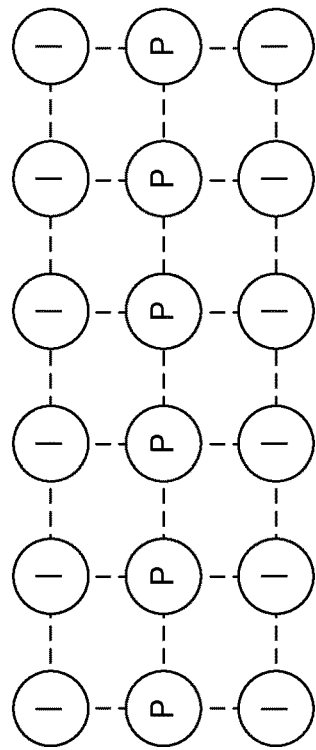
Figure 14C:
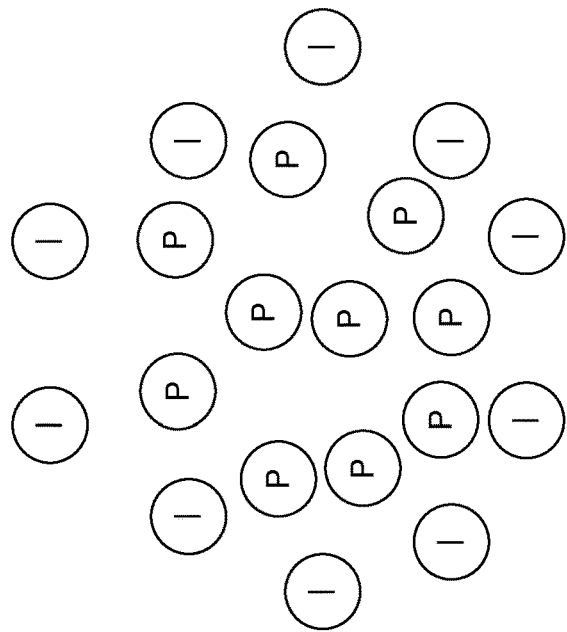

FIGS. 14A-14C show some example well patterns. FIG. 14A illustrates a line-drive well pattern. FIG. 14B illustrates a staggered line drive well pattern. FIG. 14C illustrates a peripheral water drive well pattern.

FIGS. 15A-15B illustrate example horizontal well patterns. FIG. 15A illustrates horizontal wells with the bottom row being injection wells and the top row being production wells. FIG. 15B inverts the injection and production wells.

The following, non-limiting examples, detail certain aspects of the present subject matter to solve the challenges and provide the benefits discussed herein, among others. In view of the disclosure above, various examples are set forth below. It should be noted that one or more features of an example, taken in isolation or combination, should be considered within the disclosure of this application.

Example 1 is a method of shifting geothermal energy production from a lower demand period to a higher demand period, the method comprising: injecting a fluid into a geothermal energy reservoir from an injection well comprising a horizontal injection well section; removing the fluid from the geothermal energy reservoir with a production well comprising a horizontal production well section, wherein the injection well is hydraulically coupled with the production well via a plurality of fractures disposed in the geothermal energy reservoir; generating electricity at a baseline level with heat from the removed fluid during a first demand period; modifying flow properties of the fluid in the injection well or the production well, thereby increasing hydraulic pressure in the geothermal energy reservoir, causing energy to be stored in the geothermal energy reservoir; further changing flow properties of the fluid in the injection well or the production well to reduce a fluid pressure in the geothermal energy reservoir; removing the fluid from the geothermal energy reservoir with the production well after changing the flow properties; and generating electricity at a higher level than the baseline level with heat from the fluid removed after changing the flow properties, and during a second demand period with demand higher than the first demand period.

Example 2 is the method of Example 1, wherein modifying the flow properties comprises changing a pressure of the fluid in the injection well or the production well.

Example 3 is the method of any of Examples 1-2, wherein changing the pressure of the fluid comprises choking the production well and forming a backpressure.

Example 4 is the method of any of Examples 1-3, wherein modifying the flow properties comprises changing a flow rate of the fluid in the injection well or the production well.

Example 5 is the method of any of Examples 1-4, wherein modifying the flow properties comprises injecting an amount of the fluid into the injection well that is greater than an amount of the fluid removed by the production well, thereby increasing hydraulic pressure in the geothermal energy reservoir, deforming the plurality of fractures by working against stresses in the geothermal energy reservoir, and storing energy in the geothermal energy reservoir in a form of hydraulic pressure or elastic potential energy.

Example 6 is the method of any of Examples 1-5, wherein fluid flow out of the production well is zero or less than fluid flow through the injection well.

Example 7 is the method of any of Examples 1-6, wherein generating electricity at the higher level reduces over time until the higher level is reduced to the baseline level.

Example 8 is the method of any of Examples 1-7, wherein the fluid comprises water or a gas.

Example 9 is the method of any of Examples 1-8, wherein further changing the flow properties of the fluid comprises changing a pressure of the fluid in the injection well or the production well.

Example 10 is the method of any of Examples 1-9, wherein further changing the flow properties of the fluid comprises alleviating choking of the production well to reduce backpressure.

Example 11 is the method of any of Examples 1-10, wherein further changing the flow properties of the fluid comprises changing a flow rate of the fluid in the injection well or the production well.

Example 12 is the method of any of Examples 1-11, wherein the first demand period is during daytime and the second demand period is during nighttime.

Example 13 is the method of any of Examples 1-12, further comprising monitoring flow in the injection well or the production well with one or more fiber optic elements disposed therein.

Example 14 is the method of any of Examples 1-13, further comprising pumping a gas into the production well to create artificial lift that facilitates fluid flow through the production well.

Example 15 is the method of any of Examples 1-14, wherein injecting the fluid, removing the fluid, modifying the flow properties, changing the flow properties, or removing the fluid after changing the flow are performed in real time.

Example 16 is the method of any of Examples 1-15, wherein injecting the fluid comprises moderating injection pressure and injection rates from a surface on top of the geothermal energy reservoir, thereby eliminating a use of submersible pumps or line shaft pumps disposed in the production well.

Example 17 is the method of any of Examples 1-16, wherein injecting the fluid comprises injecting the fluid at a pressure greater than a pressure required to form the plurality of fractures, thereby improving injectivity of the fluid into the geothermal energy source.

Example 18 is the method of any of Examples 1-17, wherein the geothermal energy reservoir has an average reservoir temperature in a range from about 175 degrees Celsius to about 210 degrees Celsius.

Example 19 is the method of any of Examples 1-18, wherein the geothermal energy reservoir has an average reservoir temperature in a range from about 120 degrees Celsius to about 225 degrees Celsius.

Example 20 is the method of any of Examples 1-19, further comprising inducing a thermosiphon effect by changing temperature or density of the fluid in the injection well or the production well to facilitate pumping of the fluid.

Example 21 is a system for geothermal energy production and storage, the system comprising: an injection well comprising a horizontal injection well portion disposed in a geothermal energy reservoir; an injection pump hydraulically coupled with the injection well and configured to pump a fluid from the injection well into the geothermal energy reservoir; an optional production well comprising a horizontal production well portion offset from the horizontal injection well portion, the production well disposed in the geothermal energy reservoir, wherein the injection well is hydraulically coupled with the production well via fractures in the geothermal energy reservoir; an optional production well pump hydraulically coupled with the production well and configured to pump the fluid out of the geothermal energy reservoir via the production well; a turbine operably coupled with the production well, wherein the turbine is configured to generate electricity with heat provided by the fluid pumped out of the geothermal energy reservoir; and a control system for controlling injection well flow rate, injection well pressure, production well flow rate, or production well pressure so as to increase hydraulic pressure in the geothermal energy reservoir causing energy to be stored in the geothermal energy reservoir during a desired energy storage period, wherein the stored energy may be extracted from the geothermal energy reservoir at a later time in the form of increased flow rates relative to a steady state during a desired energy recovery period while also recovering thermal energy from the geothermal energy reservoir.

Example 22 is the system of Example 21, further comprising an artificial lift system comprising a gas introduction system for introduction of gas into the production well to facilitate fluid flow through the production well.

Example 23 is the system of any of Examples 21-22, further comprising a fiber optic sensor disposed in the injection well or in the production well, the fiber optic sensor configured to sense fluid flow therethrough.

Example 24 is the system of any of Examples 21-23, further comprising a choking element hydraulically coupled to the production well, configured to create a backpressure in the production well.

Example 25 is the system of any of Examples 21-24, wherein the production well is configured to operate without a submersible pump or line shaft pump.

Example 26 is the system of any of Examples 21-25, wherein the geothermal energy reservoir has an average reservoir temperature in a range from about 175 degrees Celsius to about 210 degrees Celsius.

Example 27 is the system of any of Examples 21-26, wherein the geothermal energy reservoir has an average reservoir temperature in a range from about 120 degrees Celsius to about 225 degrees Celsius.

Example 28 is the system of any of Examples 21-27, wherein the energy recovery period is when energy demand is higher relative to the energy storage period.

Example 29 is a method of storing energy and subsequently recovering the energy on demand in a geothermal system, the method comprising injecting fluid into a geothermal reservoir from an injection well comprising a horizontal well section; removing the fluid from the geothermal reservoir with a production well comprising a horizontal well section, wherein the injection well is hydraulically coupled with the production well via a plurality of fractures disposed in the geothermal reservoir; imparting thermal energy on the fluid as the fluid travels from the injection well to the production well, the thermal energy harvested from the geothermal reservoir; managing injection flow rate, injection pressure, production flow rate, production backpressure, or fluid residence time to control energy consumption or energy generation profiles of the geothermal system, wherein during an energy storage mode, the injection flow rate exceeds the production flow rate thereby storing energy used to pump the fluid into the injection well in the geothermal reservoir in the form of hydraulic potential energy caused by compression of the fluid or elastic potential energy caused by work done to expand a fracture volume against subsurface stresses in the geothermal reservoir, and wherein during an energy recovery mode, the production backpressure is reduced thereby releasing stored hydraulic or elastic potential energy in a form of production flow rates exceeding the injection flow rates for an extended period of time; and generating electricity by removing the thermal energy from the fluid in a heat engine at a rate controlled by the production flow rate and production fluid enthalpy.

Example 30 is the method of Example 29, wherein the geothermal reservoir comprises a subsurface formation.

Example 31 is the method of any of Examples 29-30, wherein reducing the production backpressure comprises alleviating choking on the production well.

Example 32 is the method of any of Examples 29-31, wherein the fluid comprises water or a gas.

Example 33 is the method of any of Examples 29-32, wherein the energy storage mode is during daytime and energy recovery mode is during nighttime.

Example 34 is the method of any of Examples 29-33, further comprising monitoring flow in the injection well or the production well with one or more fiber optic elements.

Example 35 is the method of any of Examples 29-34, further comprising pumping a gas into the production well to create artificial lift that facilitates fluid flow through the production well.

Example 36 is the method of any of Examples 29-35, further comprising controlling operating conditions predominantly by using injection pumps that operate entirely on the earth's surface, thereby eliminating use of submersible pumps or line shaft pumps disposed in the production well, wherein the operating conditions comprise one or more of injection rate, production rate, cross-well circulation rate, injection wellhead pressure, reservoir pressure, and production wellhead pressure.

Example 37 is the method of any of Examples 29-36, wherein the geothermal reservoir has an average reservoir temperature in a range from about 175 degrees Celsius to about 210 degrees Celsius.

Example 38 is the method of any of Examples 29-37, wherein the geothermal reservoir ha an average reservoir temperature in a range from about 120 degrees Celsius to about 225 degrees Celsius.

Example 39 is the method of any of Examples 29-38, further comprising inducing a thermosiphon effect by changing temperature or density of the fluid in the injection well or the production well to facilitate pumping of the fluid.

Example 40 is a method for shifting geothermal energy production from a lower demand period to a higher demand period, the method comprising: injecting fluid into a confined geothermal reservoir system using an injection well; producing fluid from the confined geothermal reservoir system using a production well hydraulically coupled to the injection well; generating electric power at a baseline level by removing heat from the produced fluid; modifying flow properties of fluid in the injection well or the production well to enter a charging period, wherein charging period net electric power generation is less than the baseline level; and in response to the charging period ending, modifying the flow properties in the injection well or the production well to enter a discharging period, wherein discharging period net electric power generation is greater than the baseline level.

In Example 41, the subject matter of Example 40 includes, creating the confined geothermal reservoir system by: identifying a low-permeability geothermal formation; drilling into the low-permeability formation; installing the injection well and the production well with injection intervals and production intervals located within the low-permeability formation; and performing a well stimulation treatment on at least one of the wells that results in hydraulically coupling the injection and production wells via a plurality of fractures disposed in the geothermal energy reservoir; wherein the plurality of fractures are a primary flow path between the injection and production wells and wherein the low-permeability formation surrounding the fractures prevents fluid leakoff.

In Example 42, the subject matter of Example 41 includes, wherein the low-permeability formation has a permeability of less than about 0.1 millidarcy.

In Example 43, the subject matter of Examples 41-42 includes, wherein the well stimulation treatment is performed using at least one of a plug-and-perforate style stimulation treatment technique, a sliding-sleeve style stimulation treatment technique, an open-hole packer technique, a diverter technique, or a proppant material to increase or maintain hydraulic conductivity of the fractures.

In Example 44, the subject matter of Examples 41-43 includes, wherein the fluid injected using the injection well is modified with an additive to further reduce or prevent fluid leakoff from the fractures into the surrounding the low-permeability reservoir.

In Example 45, the subject matter of Examples 40-44 includes, creating the confined geothermal reservoir system by: identifying a permeable geothermal formation; drilling into the permeable geothermal formation; and installing a well placement pattern of injection wells and production wells; wherein hydraulic potential fields and fluid flow fields that arise during well operations cause artificial flow boundaries to form that prevent fluid leakoff.

In Example 46, the subject matter of Example 45 includes, wherein the permeable geothermal formation has a permeability of greater than about 0.1 millidarcy.

In Example 47, the subject matter of Examples 45-46 includes, wherein the well placement pattern includes at least one of a five-spot pattern of vertical wells, a line-drive pattern of vertical wells, a five-spot pattern of horizontal wells, a line-drive pattern of horizontal wells, a triplet well pattern of horizontal wells, or a wine-rack pattern of horizontal wells.

In Example 48, the subject matter of Examples 45-47 includes, wherein the well placement pattern involves a set of wells spaced concentrically, with each concentric ring alternating between injection wells and production wells.

In Example 49, the subject matter of Examples 45-48 includes, wherein the well placement pattern additionally includes a reservoir engineering well operations plan that induces artificial flow boundaries to cause levels of fluid leakoff below a specified level.

In Example 50, the subject matter of Examples 45-49 includes, wherein well productivity and geothermal reservoir permeability are further augmented by performing a well stimulation treatment.

In Example 51, the subject matter of Examples 45-50 includes, wherein the well placement pattern includes at least one of an inverted five-spot pattern, a seven-spot pattern, or a nine-spot well pattern.

In Example 52, the subject matter of Examples 40-51 includes, creating the confined geothermal reservoir system by: identifying a bounded geothermal formation; drilling into the bounded geothermal formation; and installing a geothermal energy system of injection and production wells; wherein a geothermal reservoir boundary of the bounded geothermal formation prevents fluid leakoff.

In Example 53, the subject matter of Example 52 includes, wherein the bounded geothermal formation is comprised of low-permeability or impermeable faults that define the geothermal reservoir boundary.

In Example 54, the subject matter of Examples 52-53 includes, wherein the bounded geothermal formation is comprised of low-permeability or impermeable formations above, below, or adjacent to the bounded geothermal formation that define the geothermal reservoir boundary.

In Example 55, the subject matter of Examples 52-54 includes, wherein the bounded geothermal formation is comprised of a combination of low-permeability or impermeable faults and low-permeability or impermeable formations above, below, or adjacent to the bounded geothermal formation that define the geothermal reservoir boundary.

In Example 56, the subject matter of Examples 52-55 includes, wherein well productivity and geothermal reservoir permeability are further augmented by performing a well stimulation treatment.

In Example 57, the subject matter of Examples 40-56 includes, wherein a reduction in net electric power generation during the charging period acts as an energy storage device consuming electricity from the electric grid.

In Example 58, the subject matter of Examples 40-57 includes, wherein an increase in net electric power generation during the discharging period acts as an energy storage device delivering electricity to the electric grid.

In Example 59, the subject matter of Examples 40-58 includes, wherein electricity is generated from thermal energy recovered from the produced fluid using an Organic Rankine Cycle generator system.

In Example 60, the subject matter of Example 59 includes, wherein a ramping rate during the charging or discharging periods is about 15% of nominal power plant capacity per minute of the Organic Rankine Cycle generator system.

In Example 61, the subject matter of Examples 59-60 includes, wherein the charging period or discharging period is optimized to take advantage of inherent variability in thermal-to-electric conversion efficiency of the Organic Rankine Cycle generator system, the inherent variability caused by fluctuations in local ambient air temperature conditions.

In Example 62, the subject matter of Example 61 includes, wherein the charging period or discharging period is optimized to take advantage of daily fluctuations in local ambient air temperature conditions.

In Example 63, the subject matter of Examples 61-62 includes, wherein the charging period or discharging period is optimized to take advantage of seasonal fluctuations in local ambient air temperature conditions.

In Example 64, the subject matter of Examples 61-63 includes, wherein historic temperature measurements are used in optimizing the charging or discharging period.

In Example 65, the subject matter of Examples 40-64 includes, wherein minimal fluid leakoff is less than about 15% of a total production rate of the geothermal energy system.

In Example 66, the subject matter of Examples 40-65 includes, wherein the geothermal energy system comprises a plurality of injection wells and a plurality of production wells disposed in the confined geothermal reservoir system.

In Example 67, the subject matter of Examples 40-66 includes, wherein the injection well or the production well, or both the injection well and the production well include a horizontal well section.

In Example 68, the subject matter of Examples 40-67 includes, wherein the injection well, the production well, or both the injection well and the production well include a deviated well section.

In Example 69, the subject matter of Examples 40-68 includes, wherein the charging period is optimized to store power from the electric grid for at least four hours and discharge the stored power to the electric grid at a round trip efficiency of at least 80%.

In Example 70, the subject matter of Examples 40-69 includes, wherein the charging period is optimized to store power from the electric grid for at least eight hours and discharge the stored power to the electric grid at a round trip efficiency of at least 70%.

In Example 71, the subject matter of Examples 40-70 includes, wherein the charging period is optimized to store power from the electric grid for at least twenty-four hours and discharge the stored power to the electric grid at a round trip efficiency of at least 60%.

In Example 72, the subject matter of Examples 40-71 includes, wherein the charging period is optimized to store power from the electric grid for at least two-hundred hours and discharge the stored power to the electric grid at a round trip efficiency of at least 50%.

In Example 73, the subject matter of Examples 40-72 includes, wherein the charging period net electric power generation includes a component related to an amount of power required to pump the fluid down the injection well that acts as a parasitic load that reduces the charging period net electric power generation.

In Example 74, the subject matter of Example 73 includes, installing a choke valve on the injection well; and tightening the valve during the charging period to cause an injection pressure in the fluid to increase, to cause the parasitic load due to the injection pump to increase, to cause a rate of charging to increase, and to cause an amount of energy stored from the electricity grid to increase.

In Example 75, the subject matter of Examples 40-74 includes, wherein modifying the flow properties of the production well during the charging period includes reducing or curtailing a production flow rate, resulting in a decrease in charging period net electric power generation.

In Example 76, the subject matter of Examples 40-75 includes, wherein the charging period net electricity generation is negative.

In Example 77, the subject matter of Examples 40-76 includes, wherein combined net electric power generation including the charging and discharging period is about equal to the baseline level.

In Example 78, the subject matter of Examples 40-77 includes, wherein flow properties of at least one of the injection well or production well are modified to optimize a round trip efficiency of the charging and discharging periods.

Example 79 is a system for shifting geothermal energy production from a period of lower energy production to a period of higher energy production at a geothermal energy system, the system comprising: an injection well configured to receive fluid and inject the fluid into a confined geothermal reservoir system; a production well hydraulically coupled to the injection well, and configured to produce fluid from the confined geothermal reservoir system; an Organic Rankine Cycle generator system configured to generate electric power at a baseline level by removing heat from the produced fluid; a control valve configured to: modify flow properties of fluid in the injection well or the production well to enter a charging period, wherein charging period net electric power generation is less than the baseline level; and in response to the charging period ending, modify the flow properties in the injection well or the production well to enter a discharging period, wherein discharging period net electric power generation is greater than the baseline level.

Example 80 is at least one machine-readable medium including instructions that, when executed by processing circuitry, cause the processing circuitry to perform operations to implement of any of Examples 1-79.

Example 81 is an apparatus comprising means to implement of any of Examples 1-79.

Example 82 is a system to implement of any of Examples 1-79.

Example 83 is a method to implement of any of Examples 1-79.

In Example 84, the system and method in any one or any combination of Examples 1-79 can optionally be configured such that all elements or options recited are available to use or select from.

The above detailed description includes references to the accompanying drawings, which form a part of the detailed description. The drawings show, by way of illustration, specific embodiments in which the inventive subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the inventive subject matter should be determined with reference to the appended claims, along with the full scope of equivalents to which such claims are entitled.

What is claimed is:

1. A method for shifting geothermal energy production from a lower demand period to a higher demand period, the method comprising:
   injecting fluid into a confined geothermal reservoir system using an injection well;
   producing fluid from the confined geothermal reservoir system using a production well hydraulically coupled to the injection well;
   generating electric power at a baseline level by removing heat from the produced fluid;
   modifying flow properties of fluid in the injection well or the production well to enter a charging period, wherein charging period net electric power generation is less than the baseline level; and
   in response to the charging period ending, modifying the flow properties of the fluid in the injection well or the production well to enter a discharging period, wherein discharging period net electric power generation is greater than the baseline level.

2. The method of claim 1, further comprising creating the confined geothermal reservoir system by:
   identifying a low-permeability geothermal formation;
   drilling into the low-permeability formation;
   installing the injection well and the production well with injection intervals and production intervals located within the low-permeability formation; and
   performing a well stimulation treatment on at least one of the wells that results in hydraulically coupling the injection and production wells via a plurality of fractures disposed in a geothermal energy reservoir;
   wherein the plurality of fractures are a primary flow path between the injection and production wells and wherein the low-permeability formation surrounding the fractures prevents fluid leakoff.

3. The method of claim 2, wherein the low-permeability formation has a permeability of less than about 0.1 millidarcy.

4. The method of claim 2, wherein the well stimulation treatment is performed using at least one of a plug-and-perforate style stimulation treatment technique, a sliding-sleeve style stimulation treatment technique, an open-hole packer technique, a diverter technique, or using a proppant material to increase or maintain hydraulic conductivity of the fractures.

5. The method of claim 2, wherein the fluid injected using the injection well is modified with an additive to further reduce or prevent fluid leakoff from the fractures into a surrounding of the low-permeability reservoir.

6. The method of claim 1, further comprising creating the confined geothermal reservoir system by:
   identifying a permeable geothermal formation;
   drilling into the permeable geothermal formation; and
   installing a well placement pattern of injection wells and production wells;
   wherein hydraulic potential fields and fluid flow fields that arise during well operations cause artificial flow boundaries to form that prevent fluid leakoff.

7. The method of claim 6, wherein the permeable geothermal formation has a permeability of greater than about 0.1 millidarcy.

8. The method of claim 6, wherein the well placement pattern includes at least one of a five-spot pattern of vertical wells, a line-drive pattern of vertical wells, a five-spot pattern of horizontal wells, a line-drive pattern of horizontal wells, a triplet well pattern of horizontal wells, or a wine-rack pattern of horizontal wells.

9. The method of claim 6, wherein the well placement pattern involves a set of wells spaced concentrically, with each set forming a concentric ring alternating between injection wells and production wells.

10. The method of claim 6, wherein the well placement pattern additionally includes a reservoir engineering well operations plan that induces artificial flow boundaries to cause levels of fluid leakoff to be below a specified level.

11. The method of claim 6, wherein well productivity and geothermal reservoir permeability are further augmented by performing a well stimulation treatment.

12. The method of claim 6, wherein the well placement pattern includes at least one of an inverted five-spot pattern, a 7-spot pattern, or a 9-spot well pattern.

13. The method of claim 1, further comprising creating the confined geothermal reservoir system by:
   identifying a bounded geothermal formation;
   drilling into the bounded geothermal formation; and
   installing a geothermal energy system of injection and production wells;
   wherein a geothermal reservoir boundary of the bounded geothermal formation prevents fluid leakoff.

14. The method of claim 13, wherein the bounded geothermal formation is comprised of low-permeability or impermeable faults that define the geothermal reservoir boundary.

15. The method of claim 13, wherein the bounded geothermal formation is comprised of low-permeability or impermeable formations above, below, or adjacent to the bounded geothermal formation that define the geothermal reservoir boundary.

16. The method of claim 13, wherein the bounded geothermal formation is comprised of a combination of low-permeability or impermeable faults and low-permeability or impermeable formations above, below, or adjacent to the bounded geothermal formation that define the geothermal reservoir boundary.

17. The method of claim 13, wherein well productivity and geothermal reservoir permeability are further augmented by performing a well stimulation treatment.

18. The method of claim 1, wherein a reduction in net electric power generation during the charging period acts as an energy storage device consuming electricity from an electric grid.

19. The method of claim 1, wherein an increase in net electric power generation during the discharging period acts as an energy storage device delivering electricity to an electric grid.

20. The method of claim 1, wherein electricity is generated from thermal energy recovered from the produced fluid using an Organic Rankine Cycle generator system.

21. The method of claim 20, wherein a ramping rate during the charging or discharging periods is about 15% of nominal power plant capacity per minute of the Organic Rankine Cycle generator system.

22. The method of claim 20, wherein the charging period or discharging period is optimized to take advantage of inherent variability in thermal-to-electric conversion efficiency of the Organic Rankine Cycle generator system, the inherent variability caused by fluctuations in local ambient air temperature conditions.

23. The method of claim 22, wherein the charging period or discharging period is optimized to take advantage of daily fluctuations in the local ambient air temperature conditions.

24. The method of claim 22, wherein the charging period or discharging period is optimized to take advantage of seasonal fluctuations in the local ambient air temperature conditions.

25. The method of claim 22, wherein historic temperature measurements are used in optimizing the charging or discharging period.

26. The method of claim 1, wherein minimal fluid leakoff is less than about 15% of a total production rate of a geothermal energy system.

27. The method of claim 1, wherein a geothermal energy system comprises a plurality of injection wells and a plurality of production wells disposed in the confined geothermal reservoir system.

28. The method of claim 1, wherein the injection well or the production well, or both the injection well and the production well include a horizontal well section.

29. The method of claim 1, wherein the injection well, the production well, or both the injection well and the production well include a deviated well section.

30. The method of claim 1, wherein the charging period is optimized to store power from an electric grid for at least 4 hours and discharge the stored power to the electric grid at a round trip efficiency of at least 80%.

31. The method of claim 1, wherein the charging period is optimized to store power from an electric grid for at least 8 hours and discharge the stored power to the electric grid at a round trip efficiency of at least 70%.

32. The method of claim 1, wherein the charging period is optimized to store power from an electric grid for at least 24 hours and discharge the stored power to the electric grid at a round trip efficiency of at least 60%.

33. The method of claim 1, wherein the charging period is optimized to store power from an electric grid for at least 200 hours and discharge the stored power to the electric grid at a round trip efficiency of at least 50%.

34. The method of claim 1, wherein the charging period net electric power generation includes a component related to an amount of power required to pump the fluid down the injection well that acts as a parasitic load that reduces the charging period net electric power generation.

35. The method of claim 34, further comprising:
installing a choke valve on the injection well; and
tightening the valve during the charging period to cause an injection pressure in the fluid to increase, to cause the parasitic load to increase, to cause a rate of charging to increase, and to cause an amount of energy stored from an electricity grid to increase.

36. The method of claim 1, wherein the modifying the flow properties of the production well during the charging period includes reducing or curtailing a production flow rate, resulting in a decrease in the charging period net electric power generation.

37. The method of claim 1, wherein the charging period net electricity generation is negative.

38. The method of claim 1, wherein combined net electric power generation including the charging and discharging period is about equal to the baseline level.

39. The method of claim 1, wherein the flow properties of the fluid in at least one of the injection well or production well are modified to optimize a round trip efficiency of the charging and discharging periods.

40. The method of claim 1, wherein the modifying the flow properties includes using a control system to automatically modify the flow properties.

41. The method of claim 1, further comprising inducing a thermosiphon effect by changing temperature or density of the fluid in the injection well or the production well to facilitate pumping of the fluid and reduce a parasitic pumping load.

42. The method of claim 1, wherein the modifying the flow properties of the fluid in the injection well or the production well to enter the charging period comprises injecting an amount of the fluid into the injection well that is greater than an amount of the fluid removed by the production well, thereby increasing hydraulic pressure in the geothermal energy reservoir system, deforming a plurality of fractures or porous medium that comprises the reservoir by working against stresses in the geothermal energy reservoir system, and storing energy in the geothermal energy reservoir system in a form of hydraulic pressure or elastic potential energy.

43. The method of claim 1, wherein the modifying the flow properties of the fluid in the injection well or the production well to enter the discharging period comprises alleviating choking of the production well to reduce backpressure.

44. A system for shifting geothermal energy production from a period of lower energy production to a period of higher energy production at a geothermal energy system, the system for shifting geothermal energy production comprising:
an injection well configured to receive fluid and inject the fluid into a confined geothermal reservoir system;
a production well hydraulically coupled to the injection well, and configured to produce fluid from the confined geothermal reservoir system;

an Organic Rankine Cycle generator system configured to generate electric power at a baseline level by removing heat from the produced fluid;

a control valve configured to:
  modify flow properties of fluid in the injection well or the production well to enter a charging period, wherein charging period net electric power generation is less than the baseline level; and
  in response to the charging period ending, modify the flow properties of the fluid in the injection well or the production well to enter a discharging period, wherein discharging period net electric power generation is greater than the baseline level.

45. The system for shifting geothermal energy production of claim 44, further comprising an artificial lift system comprising a gas introduction system for introduction of gas into the production well to facilitate fluid flow through the production well.

46. The system for shifting geothermal energy production of claim 44, further comprising a fiber optic sensor disposed in the injection well or in the production well, the fiber optic sensor configured to sense fluid flow therethrough.

47. The system for shifting geothermal energy production of claim 44, further comprising a choking element hydraulically coupled to the production well, configured to create a backpressure in the production well.

48. The system for shifting geothermal energy production of claim 44, wherein the production well is configured to operate without a submersible pump or line shaft pump.

* * * * *

UNITED STATES PATENT AND TRADEMARK OFFICE
CERTIFICATE OF CORRECTION

| | | |
|---|---|---|
| PATENT NO. | : 11,927,369 B2 | Page 1 of 1 |
| APPLICATION NO. | : 18/026541 | |
| DATED | : March 12, 2024 | |
| INVENTOR(S) | : Norbeck et al. | |

It is certified that error appears in the above-identified patent and that said Letters Patent is hereby corrected as shown below:

On the Title Page

In item (71), in "Applicant", in Column 1, Line 2, delete "Berkeley, CA" and insert --Houston, TX-- therefor Signed and Sealed this
Thirteenth Day of May, 2025

Coke Morgan Stewart
*Acting Director of the United States Patent and Trademark Office*